United States Patent
Mehta et al.

(10) Patent No.: US 11,962,681 B2
(45) Date of Patent: *Apr. 16, 2024

(54) SYMMETRIC ENCRYPTION FOR PRIVATE SMART CONTRACTS AMONG MULTIPLE PARTIES IN A PRIVATE PEER-TO-PEER NETWORK

(71) Applicant: Experian Information Solutions, Inc., Costa Mesa, CA (US)

(72) Inventors: Vijay Mehta, Newport Beach, CA (US); Alexander Phan, Aliso Viejo, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,694

(22) Filed: Apr. 4, 2023

(65) Prior Publication Data
US 2024/0048357 A1 Feb. 8, 2024

Related U.S. Application Data

(63) Continuation of application No. 16/941,142, filed on Jul. 28, 2020, now Pat. No. 11,652,607, which is a (Continued)

(51) Int. Cl.
*H04L 9/06* (2006.01)
*H04L 9/08* (2006.01)
(Continued)

(52) U.S. Cl.
CPC .......... *H04L 9/0637* (2013.01); *H04L 9/0822* (2013.01); *H04L 9/0891* (2013.01);
(Continued)

(58) Field of Classification Search
CPC ....... H04L 9/16; H04L 9/0637; H04L 9/0822; H04L 9/0891; H04L 9/0894; H04L 67/1074
(Continued)

(56) References Cited

U.S. PATENT DOCUMENTS

| 3,316,395 | A | 4/1967 | Lavin et al. |
| 4,346,442 | A | 8/1982 | Musmanno |

(Continued)

FOREIGN PATENT DOCUMENTS

| CN | 101452555 | 6/2009 |
| CN | 102096886 | 6/2011 |

(Continued)

OTHER PUBLICATIONS

U.S. Appl. No. 12/705,489, filed Feb. 12, 2010, Bargoli et al.
(Continued)

*Primary Examiner* — Samson B Lemma
(74) *Attorney, Agent, or Firm* — Knobbe, Martens, Olson & Bear, LLP

(57) ABSTRACT

Features for providing a secure method of symmetric encryption for private smart contacts among multiple parties in a private peer-to-peer network. The features include a master key representing a unique blockchain ledger. The master key may be shared among multiple participants in a private peer-to-peer network. Sharing of the master key may include communicating the master key in an encrypted message (e.g., email) using public key infrastructure (PKI). In some implementations, more complex distribution features may be includes such as quantum entanglement. The features support instantiation of a smart contract using a specific master key. The request may be submitted as an entry to the ledger with appropriate metadata and/or payload information for identifying and processing the request.

19 Claims, 3 Drawing Sheets

Related U.S. Application Data continuation of application No. 16/022,354, filed on Jun. 28, 2018, now Pat. No. 10,735,183.

(60) Provisional application No. 62/527,579, filed on Jun. 30, 2017.

(51) Int. Cl.
*H04L 9/16* (2006.01)
*H04L 67/1074* (2022.01)

(52) U.S. Cl.
CPC .............. *H04L 9/0894* (2013.01); *H04L 9/16* (2013.01); *H04L 67/1074* (2013.01)

(58) Field of Classification Search
USPC ........................................................ 713/171
See application file for complete search history.

(56) References Cited

U.S. PATENT DOCUMENTS

| | | |
|---|---|---|
| 4,491,725 A | 1/1985 | Pritchard |
| 4,774,664 A | 9/1988 | Campbell et al. |
| 4,812,628 A | 3/1989 | Boston et al. |
| 4,872,113 A | 10/1989 | Dinerstein |
| 4,891,503 A | 1/1990 | Jewell |
| 4,947,028 A | 8/1990 | Gorog |
| 5,239,462 A | 8/1993 | Jones et al. |
| 5,274,547 A | 12/1993 | Zoffel et al. |
| 5,301,105 A | 4/1994 | Cummings, Jr. |
| 5,500,513 A | 3/1996 | Langhans et al. |
| 5,557,514 A | 9/1996 | Seare et al. |
| 5,583,760 A | 12/1996 | Klesse |
| 5,590,038 A | 12/1996 | Pitroda |
| 5,611,052 A | 3/1997 | Dykstra et al. |
| 5,640,577 A | 6/1997 | Scharmer |
| 5,644,778 A | 7/1997 | Burks et al. |
| 5,649,114 A | 7/1997 | Deaton et al. |
| 5,659,725 A | 8/1997 | Levy et al. |
| 5,696,907 A | 12/1997 | Tom |
| 5,699,527 A | 12/1997 | Davidson |
| 5,704,044 A | 12/1997 | Tarter et al. |
| 5,739,512 A | 4/1998 | Tognazzini |
| 5,754,632 A | 5/1998 | Smith |
| 5,754,939 A | 5/1998 | Herz et al. |
| 5,764,923 A | 6/1998 | Tallman et al. |
| 5,774,883 A | 6/1998 | Andersen |
| 5,819,291 A | 10/1998 | Haimowitz et al. |
| 5,822,410 A | 10/1998 | McCausland et al. |
| 5,828,837 A | 10/1998 | Eikland |
| 5,832,068 A | 11/1998 | Smith |
| 5,832,447 A | 11/1998 | Rieker et al. |
| 5,842,211 A | 11/1998 | Horadan et al. |
| 5,844,218 A | 12/1998 | Kawan et al. |
| 5,878,403 A | 3/1999 | DeFrancesco |
| 5,884,287 A | 3/1999 | Edesess |
| 5,903,830 A | 5/1999 | Joao et al. |
| 5,903,881 A | 5/1999 | Schrader et al. |
| 5,907,828 A | 5/1999 | Meyer et al. |
| 5,924,082 A | 7/1999 | Silverman et al. |
| 5,926,800 A | 7/1999 | Baronowski et al. |
| 5,930,759 A | 7/1999 | Moore et al. |
| 5,930,776 A | 7/1999 | Dykstra et al. |
| 5,933,809 A | 8/1999 | Hunt et al. |
| 5,940,812 A | 8/1999 | Tengel et al. |
| 5,950,179 A | 9/1999 | Buchanan et al. |
| 5,956,693 A | 9/1999 | Geerlings |
| 5,960,430 A | 9/1999 | Haimowitz et al. |
| 5,961,593 A | 10/1999 | Gabber et al. |
| 5,966,699 A | 10/1999 | Zandi |
| 5,970,478 A | 10/1999 | Walker et al. |
| 5,978,780 A | 11/1999 | Watson |
| 5,995,947 A | 11/1999 | Fraser et al. |
| 5,999,596 A | 12/1999 | Walker et al. |
| 6,006,333 A | 12/1999 | Nielsen |
| 6,014,632 A | 1/2000 | Gamble et al. |
| 6,018,723 A | 1/2000 | Siegel et al. |
| 6,021,397 A | 2/2000 | Jones et al. |
| 6,029,149 A | 2/2000 | Dykstra et al. |
| 6,038,551 A | 3/2000 | Barlow et al. |
| 6,044,351 A | 3/2000 | Jones |
| 6,044,352 A | 3/2000 | Deavers |
| 6,067,522 A | 5/2000 | Warady et al. |
| 6,070,241 A | 5/2000 | Edwards et al. |
| 6,073,104 A | 6/2000 | Field |
| 6,073,106 A | 6/2000 | Rozen et al. |
| 6,073,140 A | 6/2000 | Morgan et al. |
| 6,088,686 A | 7/2000 | Walker et al. |
| 6,098,052 A | 8/2000 | Kosiba et al. |
| 6,108,641 A | 8/2000 | Kenna et al. |
| 6,119,103 A | 9/2000 | Basch et al. |
| 6,128,602 A | 10/2000 | Northington et al. |
| 6,129,273 A | 10/2000 | Shah |
| 6,144,948 A | 11/2000 | Walker et al. |
| 6,154,729 A | 11/2000 | Cannon et al. |
| 6,157,707 A | 12/2000 | Baulier et al. |
| 6,163,770 A | 12/2000 | Gamble et al. |
| 6,171,112 B1 | 1/2001 | Clark et al. |
| 6,182,229 B1 | 1/2001 | Nielsen |
| 6,185,543 B1 | 2/2001 | Galperin et al. |
| 6,208,973 B1 | 3/2001 | Boyer et al. |
| 6,233,566 B1 | 5/2001 | Levine et al. |
| 6,253,202 B1 | 6/2001 | Gilmour |
| 6,253,203 B1 | 6/2001 | O'Flaherty et al. |
| 6,263,447 B1 | 7/2001 | French et al. |
| 6,269,369 B1 | 7/2001 | Robertson |
| 6,275,824 B1 | 8/2001 | O'Flaherty et al. |
| 6,282,658 B2 | 8/2001 | French et al. |
| 6,298,348 B1 | 10/2001 | Eldering |
| 6,304,860 B1 | 10/2001 | Martin et al. |
| 6,311,169 B2 | 10/2001 | Duhon |
| 6,321,205 B1 | 11/2001 | Eder |
| 6,321,339 B1 | 11/2001 | French et al. |
| 6,343,279 B1 | 1/2002 | Bissonette et al. |
| 6,374,229 B1 | 4/2002 | Lowrey et al. |
| 6,374,230 B1 | 4/2002 | Walker et al. |
| 6,384,844 B1 | 5/2002 | Stewart et al. |
| 6,385,594 B1 | 5/2002 | Lebda et al. |
| 6,393,406 B1 | 5/2002 | Eder |
| 6,397,197 B1 | 5/2002 | Gindlesperger |
| 6,397,224 B1 | 5/2002 | Zubeldia et al. |
| 6,405,181 B2 | 6/2002 | Lent et al. |
| 6,424,878 B1 | 7/2002 | Barker et al. |
| 6,453,297 B1 | 9/2002 | Burks et al. |
| 6,456,983 B1 | 9/2002 | Keyes et al. |
| 6,463,533 B1 | 10/2002 | Calamera et al. |
| 6,496,827 B2 | 12/2002 | Kozam et al. |
| 6,496,936 B1 | 12/2002 | French et al. |
| 5,870,721 A1 | 1/2003 | Norris |
| 5,870,721 C1 | 1/2003 | Norris |
| 6,513,018 B1 | 1/2003 | Culhane |
| 6,523,021 B1 | 2/2003 | Monberg et al. |
| 6,523,041 B1 | 2/2003 | Morgan et al. |
| 6,532,450 B1 | 3/2003 | Brown et al. |
| 6,543,683 B2 | 4/2003 | Hoffman |
| 6,564,210 B1 | 5/2003 | Korda et al. |
| 6,581,059 B1 | 6/2003 | Barrett et al. |
| 6,587,841 B1 | 7/2003 | DeFrancesco |
| 6,598,030 B1 | 7/2003 | Siegel et al. |
| 6,601,173 B1 | 7/2003 | Mohler |
| 6,611,816 B2 | 8/2003 | Lebda et al. |
| 6,622,131 B1 | 9/2003 | Brown et al. |
| 6,629,245 B1 | 9/2003 | Stone et al. |
| 6,647,383 B1 | 11/2003 | August et al. |
| 6,658,393 B1 | 12/2003 | Basch et al. |
| 6,684,093 B2 | 1/2004 | Kuth |
| 6,714,944 B1 | 3/2004 | Shapiro et al. |
| 6,734,886 B1 | 5/2004 | Hagan et al. |
| 6,750,985 B2 | 6/2004 | Rhoads |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,795,812 B1 | 9/2004 | Lent et al. |
| 6,804,346 B1 | 10/2004 | Mewhinney |

(56) References Cited

U.S. PATENT DOCUMENTS

| | | | |
|---|---|---|---|
| 6,805,287 | B2 | 10/2004 | Bishop et al. |
| 6,807,533 | B1 | 10/2004 | Land et al. |
| 6,823,319 | B1 | 11/2004 | Lynch et al. |
| 6,826,535 | B2 | 11/2004 | Wood et al. |
| 6,845,448 | B1 | 1/2005 | Chaganti et al. |
| 6,847,942 | B1 | 1/2005 | Land et al. |
| 6,857,073 | B2 | 2/2005 | French et al. |
| 6,873,972 | B1 | 3/2005 | Marcial et al. |
| 6,901,406 | B2 | 5/2005 | Nabe et al. |
| 6,910,624 | B1 | 6/2005 | Natsuno |
| 6,934,714 | B2 | 8/2005 | Meinig |
| 6,950,807 | B2 | 9/2005 | Brock |
| 6,950,858 | B2 | 9/2005 | Ogami |
| 6,954,757 | B2 | 10/2005 | Zargham et al. |
| 6,968,319 | B1 | 11/2005 | Remington et al. |
| 6,983,379 | B1 | 1/2006 | Spalink et al. |
| 6,985,887 | B1 | 1/2006 | Sunstein et al. |
| 6,988,085 | B2 | 1/2006 | Hedy |
| 6,999,941 | B1 | 2/2006 | Agarwal |
| 7,003,491 | B2 | 2/2006 | Starkman |
| 7,028,052 | B2 | 4/2006 | Chapman et al. |
| 7,039,607 | B2 | 5/2006 | Watarai et al. |
| 7,058,817 | B1 | 6/2006 | Ellmore |
| 7,065,566 | B2 | 6/2006 | Menard et al. |
| 7,069,240 | B2 | 6/2006 | Spero et al. |
| 7,069,249 | B2 | 6/2006 | Stolfo et al. |
| 7,072,842 | B2 | 7/2006 | Provost et al. |
| 7,076,462 | B1 | 7/2006 | Nelson et al. |
| 7,107,241 | B1 | 9/2006 | Pinto |
| 7,117,172 | B1 | 10/2006 | Black |
| 7,124,144 | B2 | 10/2006 | Christianson et al. |
| 7,133,840 | B1 | 11/2006 | Kenna et al. |
| 7,133,935 | B2 | 11/2006 | Hedy |
| 7,171,371 | B2 | 1/2007 | Goldstein |
| 7,174,302 | B2 | 2/2007 | Patricelli et al. |
| 7,181,427 | B1 | 2/2007 | DeFrancesco |
| 7,188,169 | B2 | 3/2007 | Buus et al. |
| 7,191,150 | B1 | 3/2007 | Shao et al. |
| 7,191,451 | B2 | 3/2007 | Nakagawa |
| 7,197,468 | B1 | 3/2007 | Patricelli et al. |
| 7,206,768 | B1 | 4/2007 | deGroeve et al. |
| 7,212,995 | B2 | 5/2007 | Schulkins |
| 7,234,156 | B2 | 6/2007 | French et al. |
| 7,234,160 | B2 | 6/2007 | Vogel et al. |
| 7,236,950 | B2 | 6/2007 | Savage et al. |
| 7,240,363 | B1 | 7/2007 | Ellingson |
| 7,246,067 | B2 | 7/2007 | Austin et al. |
| 7,246,068 | B2 | 7/2007 | Thomas, Jr. |
| 7,249,076 | B1 | 7/2007 | Pendleton et al. |
| 7,249,096 | B1 | 7/2007 | Lasater et al. |
| 7,249,113 | B1 | 7/2007 | Continelli et al. |
| 7,251,625 | B2 | 7/2007 | Anglum |
| 7,263,497 | B1 | 8/2007 | Wiser et al. |
| 7,277,869 | B2 | 10/2007 | Starkman |
| 7,280,980 | B1 | 10/2007 | Hoadley et al. |
| 7,281,652 | B2 | 10/2007 | Foss |
| 7,289,971 | B1 | 10/2007 | O'Neil et al. |
| 7,295,988 | B1 | 11/2007 | Reeves |
| 7,298,872 | B2 | 11/2007 | Glisson |
| 7,302,420 | B2 | 11/2007 | Aggarwal et al. |
| 7,305,359 | B2 | 12/2007 | Bonnell |
| 7,310,617 | B1 | 12/2007 | Cunningham |
| 7,313,538 | B2 | 12/2007 | Wilmes et al. |
| 7,328,276 | B2 | 2/2008 | Alisuag |
| 7,333,937 | B2 | 2/2008 | Baldwin, Jr. et al. |
| 7,340,424 | B2 | 3/2008 | Gang et al. |
| 7,340,434 | B2 | 3/2008 | Schnall |
| 7,343,295 | B2 | 3/2008 | Pomerance |
| 7,346,576 | B2 | 3/2008 | Lent et al. |
| 7,356,506 | B2 | 4/2008 | Watson et al. |
| 7,356,516 | B2 | 4/2008 | Richey et al. |
| 7,366,694 | B2 | 4/2008 | Lazerson |
| 7,370,044 | B2 | 5/2008 | Mulhern et al. |
| 7,379,913 | B2 | 5/2008 | Steele et al. |
| 7,380,707 | B1 | 6/2008 | Fredman |
| 7,383,988 | B2 | 6/2008 | Slonecker, Jr. |
| 7,392,216 | B1 | 6/2008 | Palmgren et al. |
| 7,395,273 | B2 | 7/2008 | Khan et al. |
| 7,403,923 | B2 | 7/2008 | Elliott et al. |
| 7,403,942 | B1 | 7/2008 | Bayliss |
| 7,409,369 | B1 | 8/2008 | Homuth et al. |
| 7,433,864 | B2 | 10/2008 | Malik |
| 7,451,113 | B1 | 11/2008 | Kasower |
| 7,460,857 | B2 | 12/2008 | Roach, Jr. |
| 7,467,401 | B2 | 12/2008 | Cicchitto |
| 7,478,157 | B2 | 1/2009 | Bohrer et al. |
| 7,479,949 | B2 | 1/2009 | Jobs et al. |
| 7,490,356 | B2 | 2/2009 | Lieblich et al. |
| 7,505,939 | B2 | 3/2009 | Lent et al. |
| 7,527,967 | B2 | 5/2009 | Chao et al. |
| 7,529,698 | B2 | 5/2009 | Joao |
| 7,536,329 | B2 | 5/2009 | Goldberg et al. |
| 7,536,346 | B2 | 5/2009 | Aliffi et al. |
| 7,536,348 | B2 | 5/2009 | Shao et al. |
| 7,542,993 | B2 | 6/2009 | Satterfield et al. |
| 7,543,739 | B2 | 6/2009 | Brown et al. |
| 7,546,271 | B1 | 6/2009 | Chmielewski et al. |
| 7,552,080 | B1 | 6/2009 | Willard et al. |
| 7,552,086 | B1 | 6/2009 | Rajasekar et al. |
| 7,556,192 | B2 | 7/2009 | Wokaty, Jr. |
| 7,559,217 | B2 | 7/2009 | Bass |
| 7,562,184 | B2 | 7/2009 | Henmi et al. |
| 7,562,814 | B1 | 7/2009 | Shao et al. |
| 7,571,138 | B2 | 8/2009 | Miri et al. |
| 7,580,884 | B2 | 8/2009 | Cook |
| 7,584,127 | B2 | 9/2009 | Byrne et al. |
| 7,584,146 | B1 | 9/2009 | Duhon |
| 7,587,366 | B2 | 9/2009 | Grim, III et al. |
| 7,593,889 | B2 | 9/2009 | Raines et al. |
| 7,593,891 | B2 | 9/2009 | Kornegay et al. |
| 7,603,317 | B2 | 10/2009 | Adler et al. |
| 7,603,701 | B2 | 10/2009 | Gaucas |
| 7,606,725 | B2 | 10/2009 | Robertson et al. |
| 7,610,229 | B1 | 10/2009 | Kornegay |
| 7,617,116 | B2 | 11/2009 | Amar et al. |
| 7,630,932 | B2 | 12/2009 | Danaher et al. |
| 7,630,933 | B2 | 12/2009 | Peterson et al. |
| 7,640,200 | B2 | 12/2009 | Gardner et al. |
| 7,647,274 | B2 | 1/2010 | Peterson et al. |
| 7,647,344 | B2 | 1/2010 | Skurtovich, Jr. et al. |
| 7,653,592 | B1 | 1/2010 | Flaxman et al. |
| 7,672,833 | B2 | 3/2010 | Blume et al. |
| 7,676,410 | B2 | 3/2010 | Petralia |
| 7,676,418 | B1 | 3/2010 | Chung et al. |
| 7,689,505 | B2 | 3/2010 | Kasower |
| 7,689,506 | B2 | 3/2010 | Fei et al. |
| 7,690,032 | B1 | 3/2010 | Peirce |
| 7,693,787 | B2 | 4/2010 | Provinse |
| 7,698,214 | B1 | 4/2010 | Lindgren |
| 7,698,217 | B1 | 4/2010 | Phillips et al. |
| 7,698,445 | B2 | 4/2010 | Fitzpatrick et al. |
| 7,707,102 | B2 | 4/2010 | Rothstein |
| 7,711,635 | B2 | 5/2010 | Steele et al. |
| 7,711,636 | B2 | 5/2010 | Robida et al. |
| 7,720,750 | B2 | 5/2010 | Brody |
| 7,725,385 | B2 | 5/2010 | Royer et al. |
| 7,729,959 | B1 | 6/2010 | Wells et al. |
| 7,734,522 | B2 | 6/2010 | Johnson et al. |
| 7,739,139 | B2 | 6/2010 | Robertson et al. |
| 7,747,559 | B2 | 6/2010 | Leitner et al. |
| 7,752,132 | B2 | 7/2010 | Stewart et al. |
| 7,756,789 | B2 | 7/2010 | Welker et al. |
| 7,765,311 | B2 | 7/2010 | Itabashi et al. |
| 7,769,696 | B2 | 8/2010 | Yoda |
| 7,769,998 | B2 | 8/2010 | Lynch et al. |
| 7,774,257 | B2 | 8/2010 | Maggioncalda et al. |
| 7,774,270 | B1 | 8/2010 | MacCloskey |
| 7,783,515 | B1 | 8/2010 | Kumar et al. |
| 7,783,562 | B1 | 8/2010 | Ellis |
| 7,792,715 | B1 | 9/2010 | Kasower |
| 7,797,725 | B2 | 9/2010 | Lunt et al. |
| 7,801,807 | B2 | 9/2010 | DeFrancesco et al. |
| 7,801,828 | B2 | 9/2010 | Candella et al. |
| 7,805,345 | B2 | 9/2010 | Abrahams et al. |

(56) References Cited

U.S. PATENT DOCUMENTS

| | | |
|---|---|---|
| 7,814,004 B2 | 10/2010 | Haggerty et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,832,006 B2 | 11/2010 | Chen et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,841,008 B1 | 11/2010 | Cole et al. |
| 7,848,972 B1 | 12/2010 | Sharma |
| 7,848,978 B2 | 12/2010 | Imrey et al. |
| 7,849,004 B2 | 12/2010 | Choudhuri et al. |
| 7,849,014 B2 | 12/2010 | Erikson |
| 7,853,493 B2 | 12/2010 | DeBie et al. |
| 7,853,518 B2 | 12/2010 | Cagan |
| 7,853,984 B2 | 12/2010 | Antell et al. |
| 7,856,386 B2 | 12/2010 | Hazlehurst et al. |
| 7,860,782 B2 | 12/2010 | Cash et al. |
| 7,860,786 B2 | 12/2010 | Blackburn et al. |
| 7,870,078 B2 | 1/2011 | Clark et al. |
| 7,877,304 B1 | 1/2011 | Coulter |
| 7,880,728 B2 | 2/2011 | de los Reyes et al. |
| 7,899,750 B1 | 3/2011 | Klieman et al. |
| 7,900,052 B2 | 3/2011 | Joans |
| 7,904,306 B2 | 3/2011 | Johnson et al. |
| 7,904,367 B2 | 3/2011 | Chung et al. |
| 7,908,242 B1 | 3/2011 | Achanta |
| 7,912,865 B2 | 3/2011 | Akerman et al. |
| 7,925,582 B1 | 4/2011 | Kornegay et al. |
| 7,930,195 B2 | 4/2011 | Heyns et al. |
| 7,930,252 B2 | 4/2011 | Bender et al. |
| 7,941,363 B2 | 5/2011 | Tanaka et al. |
| 7,966,192 B2 | 6/2011 | Pagliari et al. |
| 7,970,676 B2 | 6/2011 | Feinstein |
| 7,970,679 B2 | 6/2011 | Kasower |
| 7,970,698 B2 | 6/2011 | Gupta et al. |
| 7,979,908 B2 | 7/2011 | Millwee |
| 7,983,976 B2 | 7/2011 | Nafeh et al. |
| 7,983,979 B2 | 7/2011 | Holland, IV |
| 7,991,689 B1 | 8/2011 | Brunzell et al. |
| 8,001,034 B2 | 8/2011 | Chung et al. |
| 8,001,040 B2 | 8/2011 | Keithley |
| 8,001,042 B1 | 8/2011 | Brunzell et al. |
| 8,001,043 B1 | 8/2011 | Walker et al. |
| 8,001,153 B2 | 8/2011 | Skurtovich, Jr. et al. |
| 8,015,107 B2 | 9/2011 | Kornegay et al. |
| 8,019,828 B2 | 9/2011 | Cash et al. |
| 8,019,843 B2 | 9/2011 | Cash et al. |
| 8,024,778 B2 | 9/2011 | Cash et al. |
| 8,032,932 B2 | 10/2011 | Speyer et al. |
| 8,060,424 B2 | 11/2011 | Kasower |
| 8,060,441 B2 | 11/2011 | Stewart et al. |
| 8,064,586 B2 | 11/2011 | Shaffer et al. |
| 8,065,233 B2 | 11/2011 | Lee et al. |
| 8,065,234 B2 | 11/2011 | Liao et al. |
| 8,073,785 B1 | 12/2011 | Candella et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,082,202 B2 | 12/2011 | Weiss |
| 8,086,523 B1 | 12/2011 | Palmer |
| 8,095,443 B2 | 1/2012 | DeBie |
| 8,095,458 B2 | 1/2012 | Peterson et al. |
| 8,099,309 B1 | 1/2012 | Bober |
| 8,099,341 B2 | 1/2012 | Varghese |
| 8,104,679 B2 | 1/2012 | Brown |
| 8,127,982 B1 | 3/2012 | Casey et al. |
| 8,127,986 B1 | 3/2012 | Taylor et al. |
| 8,131,685 B1 | 3/2012 | Gedalius et al. |
| 8,135,642 B1 | 3/2012 | Krause |
| 8,160,960 B1 | 4/2012 | Fei et al. |
| 8,195,549 B2 | 6/2012 | Kasower |
| 8,201,257 B1 | 6/2012 | Andres et al. |
| 8,204,774 B2 | 6/2012 | Chwast et al. |
| 8,204,812 B2 | 6/2012 | Stewart et al. |
| 8,219,535 B1 | 7/2012 | Kobori et al. |
| 8,224,723 B2 | 7/2012 | Bosch et al. |
| 8,225,395 B2 | 7/2012 | Atwood et al. |
| 8,234,498 B2 | 7/2012 | Britti et al. |
| 8,239,130 B1 | 8/2012 | Upstill et al. |
| 8,255,978 B2 | 8/2012 | Dick |
| 8,285,656 B1 | 10/2012 | Chang et al. |
| 8,290,840 B2 | 10/2012 | Kasower |
| 8,296,229 B1 | 10/2012 | Yellin et al. |
| 8,312,033 B1 | 11/2012 | McMillan |
| 8,321,334 B1 | 11/2012 | Kornegay et al. |
| 8,321,339 B2 | 11/2012 | Imrey et al. |
| 8,327,429 B2 | 12/2012 | Speyer et al. |
| 8,335,741 B2 | 12/2012 | Kornegay et al. |
| 8,340,685 B2 | 12/2012 | Cochran et al. |
| 8,355,967 B2 | 1/2013 | Debie et al. |
| 8,364,518 B1 | 1/2013 | Blake et al. |
| 8,364,588 B2 | 1/2013 | Celka et al. |
| 8,380,618 B1 | 2/2013 | Kazenas et al. |
| 8,412,593 B1 | 4/2013 | Song et al. |
| 8,418,254 B2 | 4/2013 | Britti et al. |
| 8,433,512 B1 | 4/2013 | Lopatenko et al. |
| 8,433,648 B2 | 4/2013 | Keithley et al. |
| 8,442,886 B1 | 5/2013 | Haggerty et al. |
| 8,458,062 B2 | 6/2013 | Dutt et al. |
| 8,458,074 B2 | 6/2013 | Showalter |
| 8,464,939 B1 | 6/2013 | Taylor et al. |
| 8,473,354 B2 | 6/2013 | Psota et al. |
| 8,473,410 B1 | 6/2013 | Haggerty et al. |
| 8,515,844 B2 | 8/2013 | Kasower |
| 8,533,030 B1 | 9/2013 | Dhir et al. |
| 8,533,118 B2 | 9/2013 | Weller et al. |
| 8,538,869 B1 | 9/2013 | Haggerty et al. |
| 8,560,436 B2 | 10/2013 | Ingram et al. |
| 8,566,029 B1 | 10/2013 | Lopatenko et al. |
| 8,566,141 B1 | 10/2013 | Nagdev et al. |
| 8,571,971 B1 | 10/2013 | Brown et al. |
| 8,572,083 B1 | 10/2013 | Snell et al. |
| 8,589,069 B1 | 11/2013 | Lehman |
| 8,589,208 B2 | 11/2013 | Kruger et al. |
| 8,595,101 B1 | 11/2013 | Daukas et al. |
| 8,600,886 B2 | 12/2013 | Ramavarjula et al. |
| 8,606,694 B2 | 12/2013 | Campbell et al. |
| 8,621,562 B2 | 12/2013 | Antell et al. |
| 8,626,618 B2 | 1/2014 | Psota et al. |
| 8,631,242 B2 | 1/2014 | Britti et al. |
| 8,639,616 B1 | 1/2014 | Rolenaitis et al. |
| 8,646,101 B1 | 2/2014 | Millwee |
| 8,650,407 B2 | 2/2014 | Britti et al. |
| 8,671,107 B2 | 3/2014 | Scully et al. |
| 8,671,115 B2 | 3/2014 | Skurtovich, Jr. et al. |
| 8,694,420 B1 | 4/2014 | Oliai |
| 8,719,159 B2 | 5/2014 | Keithley |
| 8,725,613 B1 | 5/2014 | Celka et al. |
| 8,738,516 B1 | 5/2014 | Dean et al. |
| 8,744,956 B1 | 6/2014 | DiChiara et al. |
| 8,756,099 B2 | 6/2014 | Keithley et al. |
| 8,768,914 B2 | 7/2014 | Scriffignano et al. |
| 8,775,299 B2 | 7/2014 | Achanta et al. |
| 8,781,882 B1 | 7/2014 | Arboletti et al. |
| 8,781,951 B2 | 7/2014 | Lewis et al. |
| 8,781,953 B2 | 7/2014 | Kasower |
| 8,781,954 B2 | 7/2014 | Haggerty et al. |
| 8,806,218 B2 | 8/2014 | Hatakeda |
| 8,856,894 B1 | 10/2014 | Dean et al. |
| 8,930,251 B2 | 1/2015 | DeBie |
| 8,930,262 B1 | 1/2015 | Searson et al. |
| 8,931,058 B2 | 1/2015 | DiChiara et al. |
| 8,938,399 B1 | 1/2015 | Herman |
| 8,938,432 B2 | 1/2015 | Rossmark et al. |
| 8,949,981 B1 | 2/2015 | Trollope et al. |
| 9,043,930 B1 | 5/2015 | Britti et al. |
| 9,058,627 B1 | 6/2015 | Wasser et al. |
| 9,116,918 B1 | 8/2015 | Kim |
| 9,143,541 B1 | 9/2015 | Szamonek et al. |
| 9,147,042 B1 | 9/2015 | Haller et al. |
| 9,183,363 B1 | 11/2015 | Millwee |
| 9,189,789 B1 | 11/2015 | Hastings et al. |
| 9,251,541 B2 | 2/2016 | Celka et al. |

(56) References Cited

U.S. PATENT DOCUMENTS

| | | |
|---|---|---|
| 9,256,624 B2 | 2/2016 | Skurtovich, Jr. et al. |
| 9,256,904 B1 | 2/2016 | Haller et al. |
| 9,443,268 B1 | 9/2016 | Kapczynski et al. |
| 9,477,988 B2 | 10/2016 | Haggerty et al. |
| 9,489,694 B2 | 11/2016 | Haller et al. |
| 9,553,936 B2 | 1/2017 | Dijk et al. |
| 9,558,519 B1 | 1/2017 | Burger |
| 9,607,336 B1 | 3/2017 | Dean et al. |
| 9,652,802 B1 | 5/2017 | Kasower |
| 9,684,905 B1 | 6/2017 | Haller et al. |
| 9,697,263 B1 | 7/2017 | Girulat, Jr. |
| 9,710,523 B2 | 7/2017 | Skurtovich, Jr. et al. |
| 9,760,553 B1 | 9/2017 | Hecht-Nielse |
| 9,792,648 B1 | 10/2017 | Haller et al. |
| 10,115,155 B1 | 10/2018 | Haller et al. |
| 10,362,058 B2 * | 7/2019 | Hu .................. H04L 63/04 |
| 10,402,792 B2 * | 9/2019 | Lin .................. G06Q 50/08 |
| 10,408,055 B2 | 9/2019 | Soofi et al. |
| 10,417,704 B2 | 9/2019 | Searson et al. |
| 10,579,647 B1 | 3/2020 | Allsopp et al. |
| 10,650,448 B1 | 5/2020 | Haller et al. |
| 10,735,183 B1 | 8/2020 | Mehta et al. |
| 10,757,154 B1 | 8/2020 | Jacobs et al. |
| 10,909,617 B2 | 2/2021 | Kasower |
| 10,984,404 B2 | 4/2021 | Nack et al. |
| 11,004,147 B1 | 5/2021 | Haller et al. |
| 11,159,593 B1 | 10/2021 | Jacobs et al. |
| 11,227,001 B2 | 1/2022 | Rege et al. |
| 11,379,821 B2 | 7/2022 | Butvin et al. |
| 11,620,403 B2 | 4/2023 | Chen et al. |
| 11,636,540 B1 | 4/2023 | Haller et al. |
| 11,652,607 B1 | 5/2023 | Mehta et al. |
| 2001/0011247 A1 | 8/2001 | O'Flaherty et al. |
| 2001/0014868 A1 | 8/2001 | Herz et al. |
| 2001/0014878 A1 | 8/2001 | Mitra et al. |
| 2001/0029470 A1 | 10/2001 | Schultz et al. |
| 2001/0029482 A1 | 10/2001 | Tealdi et al. |
| 2001/0034618 A1 | 10/2001 | Kessler et al. |
| 2001/0034631 A1 | 10/2001 | Kiselik |
| 2001/0039523 A1 | 11/2001 | Iwamoto |
| 2001/0039532 A1 | 11/2001 | Coleman, Jr. et al. |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0049620 A1 | 12/2001 | Blasko |
| 2002/0004736 A1 | 1/2002 | Roundtree et al. |
| 2002/0004774 A1 | 1/2002 | Defarlo |
| 2002/0010594 A1 | 1/2002 | Levine |
| 2002/0026519 A1 | 2/2002 | Itabashi et al. |
| 2002/0042763 A1 | 4/2002 | Pillay et al. |
| 2002/0052841 A1 | 5/2002 | Guthrie et al. |
| 2002/0055869 A1 | 5/2002 | Hegg |
| 2002/0069122 A1 | 6/2002 | Yun et al. |
| 2002/0077964 A1 | 6/2002 | Brody et al. |
| 2002/0087460 A1 | 7/2002 | Hornung |
| 2002/0091635 A1 | 7/2002 | Dilip et al. |
| 2002/0091650 A1 | 7/2002 | Ellis |
| 2002/0099635 A1 | 7/2002 | Guiragosian |
| 2002/0099641 A1 | 7/2002 | Mills et al. |
| 2002/0099824 A1 | 7/2002 | Bender et al. |
| 2002/0107765 A1 | 8/2002 | Walker |
| 2002/0107849 A1 | 8/2002 | Hickey et al. |
| 2002/0111816 A1 | 8/2002 | Lortscher et al. |
| 2002/0116247 A1 | 8/2002 | Tucker et al. |
| 2002/0119824 A1 | 8/2002 | Allen |
| 2002/0128962 A1 | 9/2002 | Kasower |
| 2002/0128981 A1 | 9/2002 | Kawan et al. |
| 2002/0133365 A1 | 9/2002 | Grey et al. |
| 2002/0133462 A1 | 9/2002 | Shteyn |
| 2002/0138297 A1 | 9/2002 | Lee |
| 2002/0138445 A1 | 9/2002 | Laage et al. |
| 2002/0138470 A1 | 9/2002 | Zhou |
| 2002/0147617 A1 | 10/2002 | Schoenbaum et al. |
| 2002/0147669 A1 | 10/2002 | Taylor et al. |
| 2002/0152166 A1 | 10/2002 | Dutta et al. |
| 2002/0156676 A1 | 10/2002 | Ahrens et al. |
| 2002/0156797 A1 | 10/2002 | Lee et al. |
| 2002/0161664 A1 | 10/2002 | Shaya et al. |
| 2002/0165757 A1 | 11/2002 | Lisser |
| 2002/0169747 A1 | 11/2002 | Chapman et al. |
| 2002/0173994 A1 | 11/2002 | Ferguson, III |
| 2002/0174048 A1 | 11/2002 | Dheer et al. |
| 2002/0184054 A1 | 12/2002 | Cox et al. |
| 2002/0188478 A1 | 12/2002 | Breeland et al. |
| 2002/0194103 A1 | 12/2002 | Nabe |
| 2002/0194120 A1 | 12/2002 | Russell et al. |
| 2002/0198806 A1 | 12/2002 | Blagg et al. |
| 2002/0198824 A1 | 12/2002 | Cook |
| 2002/0198830 A1 | 12/2002 | Randell et al. |
| 2003/0009418 A1 | 1/2003 | Green et al. |
| 2003/0009426 A1 | 1/2003 | Ruiz-Sanchez |
| 2003/0014336 A1 | 1/2003 | Dao et al. |
| 2003/0018549 A1 | 1/2003 | Fei et al. |
| 2003/0018558 A1 | 1/2003 | Heffner et al. |
| 2003/0027635 A1 | 2/2003 | Walker et al. |
| 2003/0028402 A1 | 2/2003 | Ulrich et al. |
| 2003/0036926 A1 | 2/2003 | Starkey et al. |
| 2003/0036995 A1 | 2/2003 | Lazerson |
| 2003/0037054 A1 | 2/2003 | Dutta et al. |
| 2003/0041019 A1 | 2/2003 | Vagim, III et al. |
| 2003/0041031 A1 | 2/2003 | Hedy |
| 2003/0046112 A1 | 3/2003 | Dutta et al. |
| 2003/0046311 A1 | 3/2003 | Baidya et al. |
| 2003/0050795 A1 | 3/2003 | Baldwin, Jr. et al. |
| 2003/0050796 A1 | 3/2003 | Baldwin, Jr. et al. |
| 2003/0065563 A1 | 4/2003 | Elliott et al. |
| 2003/0069839 A1 | 4/2003 | Whittington et al. |
| 2003/0078877 A1 | 4/2003 | Beirne et al. |
| 2003/0097342 A1 | 5/2003 | Whittingtom |
| 2003/0097380 A1 | 5/2003 | Mulhern et al. |
| 2003/0110111 A1 | 6/2003 | Nalebuff et al. |
| 2003/0126072 A1 | 7/2003 | Brock |
| 2003/0154162 A1 | 8/2003 | Danaher et al. |
| 2003/0163416 A1 | 8/2003 | Kitajima |
| 2003/0163483 A1 | 8/2003 | Zingher et al. |
| 2003/0195859 A1 | 10/2003 | Lawrence |
| 2003/0200184 A1 | 10/2003 | Dominguez et al. |
| 2003/0204752 A1 | 10/2003 | Garrison |
| 2003/0208412 A1 | 11/2003 | Hillestad et al. |
| 2003/0220858 A1 | 11/2003 | Lam et al. |
| 2003/0229507 A1 | 12/2003 | Perge |
| 2003/0233259 A1 | 12/2003 | Mistretta et al. |
| 2004/0006488 A1 | 1/2004 | Fitall et al. |
| 2004/0010443 A1 | 1/2004 | May et al. |
| 2004/0010458 A1 | 1/2004 | Friedman |
| 2004/0023637 A1 | 2/2004 | Johnson et al. |
| 2004/0024709 A1 | 2/2004 | Yu et al. |
| 2004/0030629 A1 | 2/2004 | Freeman et al. |
| 2004/0030649 A1 | 2/2004 | Nelson et al. |
| 2004/0039688 A1 | 2/2004 | Sulkowski et al. |
| 2004/0044563 A1 | 3/2004 | Stein |
| 2004/0044673 A1 | 3/2004 | Brady et al. |
| 2004/0049473 A1 | 3/2004 | Gower et al. |
| 2004/0050928 A1 | 3/2004 | Bishop et al. |
| 2004/0054619 A1 | 3/2004 | Watson et al. |
| 2004/0064402 A1 | 4/2004 | Dreyer et al. |
| 2004/0073456 A1 | 4/2004 | Gottlieb et al. |
| 2004/0078323 A1 | 4/2004 | Johnston et al. |
| 2004/0078324 A1 | 4/2004 | Lonnberg et al. |
| 2004/0088237 A1 | 5/2004 | Moenickheim et al. |
| 2004/0088255 A1 | 5/2004 | Zielke et al. |
| 2004/0103147 A1 | 5/2004 | Flesher et al. |
| 2004/0111305 A1 | 6/2004 | Gavan et al. |
| 2004/0111359 A1 | 6/2004 | Hudock |
| 2004/0117235 A1 | 6/2004 | Shacham |
| 2004/0117302 A1 | 6/2004 | Weichert et al. |
| 2004/0128150 A1 | 7/2004 | Lundegren |
| 2004/0128230 A1 | 7/2004 | Oppenheimer et al. |
| 2004/0133460 A1 | 7/2004 | Berlin et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0138994 A1 | 7/2004 | DeFrancesco et al. |
| 2004/0139025 A1 | 7/2004 | Coleman |

(56) References Cited

U.S. PATENT DOCUMENTS

| | | |
|---|---|---|
| 2004/0143546 A1 | 7/2004 | Wood et al. |
| 2004/0153437 A1 | 8/2004 | Buchan |
| 2004/0153521 A1 | 8/2004 | Kogo |
| 2004/0158523 A1 | 8/2004 | Dort |
| 2004/0159700 A1 | 8/2004 | Khan et al. |
| 2004/0167793 A1 | 8/2004 | Masuoka et al. |
| 2004/0177030 A1 | 9/2004 | Shoham |
| 2004/0177114 A1 | 9/2004 | Friedman et al. |
| 2004/0193538 A1 | 9/2004 | Raines |
| 2004/0199456 A1 | 10/2004 | Flint et al. |
| 2004/0199458 A1 | 10/2004 | Ho |
| 2004/0199462 A1 | 10/2004 | Starrs |
| 2004/0215553 A1 | 10/2004 | Gang et al. |
| 2004/0215554 A1 | 10/2004 | Kemper et al. |
| 2004/0215555 A1 | 10/2004 | Kemper et al. |
| 2004/0215556 A1 | 10/2004 | Merkley, Jr. et al. |
| 2004/0215584 A1 | 10/2004 | Yao |
| 2004/0220865 A1 | 11/2004 | Lozowski et al. |
| 2004/0220896 A1 | 11/2004 | Finlay et al. |
| 2004/0220918 A1 | 11/2004 | Scriffignano et al. |
| 2004/0225545 A1 | 11/2004 | Turner et al. |
| 2004/0225594 A1 | 11/2004 | Nolan, III et al. |
| 2004/0225597 A1 | 11/2004 | Oppenheimer et al. |
| 2004/0225643 A1 | 11/2004 | Alpha et al. |
| 2004/0230534 A1 | 11/2004 | McGough |
| 2004/0243450 A1 | 12/2004 | Bernard, Jr. et al. |
| 2004/0243588 A1 | 12/2004 | Tanner et al. |
| 2004/0267660 A1 | 12/2004 | Greenwood et al. |
| 2004/0267714 A1 | 12/2004 | Frid et al. |
| 2005/0004855 A1 | 1/2005 | Jenson et al. |
| 2005/0004870 A1 | 1/2005 | McGaughey |
| 2005/0005168 A1 | 1/2005 | Dick |
| 2005/0010513 A1 | 1/2005 | Duckworth et al. |
| 2005/0027633 A1 | 2/2005 | Fortuna et al. |
| 2005/0027983 A1 | 2/2005 | Klawon |
| 2005/0027995 A1 | 2/2005 | Menschik et al. |
| 2005/0055231 A1 | 3/2005 | Lee |
| 2005/0055275 A1 | 3/2005 | Newman et al. |
| 2005/0058262 A1 | 3/2005 | Timmins et al. |
| 2005/0071328 A1 | 3/2005 | Lawrence |
| 2005/0086071 A1 | 4/2005 | Fox, Jr. et al. |
| 2005/0086072 A1 | 4/2005 | Fox, Jr. et al. |
| 2005/0086126 A1 | 4/2005 | Patterson |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0102206 A1 | 5/2005 | Savasoglu et al. |
| 2005/0125291 A1 | 6/2005 | Demkiw Grayson et al. |
| 2005/0125397 A1 | 6/2005 | Gross et al. |
| 2005/0137899 A1 | 6/2005 | Davies et al. |
| 2005/0137912 A1 | 6/2005 | Rao et al. |
| 2005/0154617 A1 | 7/2005 | Ruggieri et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0197953 A1 | 9/2005 | Broadbent et al. |
| 2005/0209880 A1 | 9/2005 | Drelicharz et al. |
| 2005/0209922 A1 | 9/2005 | Hofmeister |
| 2005/0216953 A1 | 9/2005 | Ellingson |
| 2005/0228748 A1 | 10/2005 | Togher et al. |
| 2005/0251474 A1 | 11/2005 | Shinn et al. |
| 2005/0267840 A1 | 12/2005 | Holm-Blagg et al. |
| 2005/0273423 A1 | 12/2005 | Kiai et al. |
| 2005/0273431 A1 | 12/2005 | Abel et al. |
| 2005/0276401 A1 | 12/2005 | Madill et al. |
| 2005/0279827 A1 | 12/2005 | Mascavage et al. |
| 2005/0288998 A1 | 12/2005 | Verma et al. |
| 2006/0014129 A1 | 1/2006 | Coleman et al. |
| 2006/0015425 A1 | 1/2006 | Brooks |
| 2006/0029107 A1 | 2/2006 | McCullough et al. |
| 2006/0031158 A1 | 2/2006 | Orman |
| 2006/0032909 A1 | 2/2006 | Seegar |
| 2006/0036543 A1 | 2/2006 | Blagg et al. |
| 2006/0059086 A1 | 3/2006 | Mulhern |
| 2006/0069635 A1 | 3/2006 | Ram et al. |
| 2006/0074793 A1 | 4/2006 | Hibbert et al. |
| 2006/0080139 A1 | 4/2006 | Mainzer |
| 2006/0080233 A1 | 4/2006 | Mendelovich et al. |
| 2006/0080251 A1 | 4/2006 | Fried et al. |
| 2006/0085334 A1 | 4/2006 | Murphy |
| 2006/0089842 A1 | 4/2006 | Medawar |
| 2006/0095363 A1 | 5/2006 | May |
| 2006/0100944 A1 | 5/2006 | Reddin et al. |
| 2006/0100954 A1 | 5/2006 | Schoen |
| 2006/0106670 A1 | 5/2006 | Cai et al. |
| 2006/0123461 A1 | 6/2006 | Lunt et al. |
| 2006/0131390 A1 | 6/2006 | Kim |
| 2006/0155573 A1 | 7/2006 | Hartunian |
| 2006/0155639 A1 | 7/2006 | Lynch et al. |
| 2006/0173772 A1 | 8/2006 | Hayes et al. |
| 2006/0177226 A1 | 8/2006 | Ellis, III |
| 2006/0178971 A1 | 8/2006 | Owen et al. |
| 2006/0178983 A1 | 8/2006 | Nice et al. |
| 2006/0184410 A1 | 8/2006 | Ramamurthy et al. |
| 2006/0184440 A1 | 8/2006 | Britti et al. |
| 2006/0184585 A1 | 8/2006 | Grear et al. |
| 2006/0202012 A1 | 9/2006 | Grano et al. |
| 2006/0204051 A1 | 9/2006 | Holland, IV |
| 2006/0212407 A1 | 9/2006 | Lyon |
| 2006/0229799 A1 | 10/2006 | Nimmo et al. |
| 2006/0229943 A1 | 10/2006 | Mathias et al. |
| 2006/0229961 A1 | 10/2006 | Lyftogt et al. |
| 2006/0235743 A1 | 10/2006 | Long et al. |
| 2006/0242046 A1 | 10/2006 | Haggerty et al. |
| 2006/0271457 A1 | 11/2006 | Romain et al. |
| 2006/0277092 A1 | 12/2006 | Williams |
| 2006/0277141 A1 | 12/2006 | Palmer |
| 2006/0278704 A1 | 12/2006 | Saunders et al. |
| 2006/0282359 A1 | 12/2006 | Nobili et al. |
| 2006/0287764 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0294199 A1 | 12/2006 | Bertholf |
| 2007/0011083 A1 | 1/2007 | Bird et al. |
| 2007/0016500 A1 | 1/2007 | Chatterji et al. |
| 2007/0016517 A1 | 1/2007 | Solomon |
| 2007/0016520 A1 | 1/2007 | Gang et al. |
| 2007/0022141 A1 | 1/2007 | Singleton et al. |
| 2007/0027778 A1 | 2/2007 | Schellhammer et al. |
| 2007/0038483 A1 | 2/2007 | Wood |
| 2007/0038497 A1 | 2/2007 | Britti et al. |
| 2007/0038568 A1 | 2/2007 | Greene et al. |
| 2007/0043654 A1 | 2/2007 | Libman |
| 2007/0045402 A1 | 3/2007 | Rothschild |
| 2007/0045405 A1 | 3/2007 | Rothschild |
| 2007/0067207 A1 | 3/2007 | Haggerty et al. |
| 2007/0067297 A1 | 3/2007 | Kublickis |
| 2007/0083460 A1 | 4/2007 | Bachenheimer |
| 2007/0083463 A1 | 4/2007 | Kraft |
| 2007/0088950 A1 | 4/2007 | Wheeler et al. |
| 2007/0094137 A1 | 4/2007 | Phillips et al. |
| 2007/0094230 A1 | 4/2007 | Subramaniam et al. |
| 2007/0094241 A1 | 4/2007 | M. Blackwell et al. |
| 2007/0106582 A1 | 5/2007 | Baker et al. |
| 2007/0112668 A1 | 5/2007 | Celano et al. |
| 2007/0118410 A1 | 5/2007 | Nadai |
| 2007/0130070 A1 | 6/2007 | Williams |
| 2007/0156576 A1 | 7/2007 | Imrey et al. |
| 2007/0156692 A1 | 7/2007 | Rosewarne |
| 2007/0162414 A1 | 7/2007 | Horowitz et al. |
| 2007/0192121 A1 | 8/2007 | Routson et al. |
| 2007/0192122 A1 | 8/2007 | Routson et al. |
| 2007/0198336 A1 | 8/2007 | Thompson |
| 2007/0198407 A1 | 8/2007 | Winter |
| 2007/0208640 A1 | 9/2007 | Banasiak et al. |
| 2007/0214000 A1 | 9/2007 | Shahrabi et al. |
| 2007/0226047 A1 | 9/2007 | Ward |
| 2007/0226093 A1 | 9/2007 | Chan et al. |
| 2007/0250459 A1 | 10/2007 | Schwarz et al. |
| 2007/0255654 A1 | 11/2007 | Whipple et al. |
| 2007/0255655 A1 | 11/2007 | Kemper et al. |

(56) References Cited

U.S. PATENT DOCUMENTS

| | | |
|---|---|---|
| 2007/0258626 A1 | 11/2007 | Reiner |
| 2007/0261114 A1 | 11/2007 | Pomerantsev |
| 2007/0262137 A1 | 11/2007 | Brown |
| 2007/0266439 A1 | 11/2007 | Kraft |
| 2007/0279187 A1 | 12/2007 | Hekmatpour et al. |
| 2007/0282730 A1 | 12/2007 | Carpenter et al. |
| 2007/0284433 A1 | 12/2007 | Domenica et al. |
| 2007/0288360 A1 | 12/2007 | Seeklus |
| 2007/0294195 A1 | 12/2007 | Curry et al. |
| 2007/0294431 A1 | 12/2007 | Adelman et al. |
| 2007/0299699 A1 | 12/2007 | Policelli et al. |
| 2008/0010203 A1 | 1/2008 | Grant |
| 2008/0010206 A1 | 1/2008 | Coleman |
| 2008/0015954 A1 | 1/2008 | Huber et al. |
| 2008/0015979 A1 | 1/2008 | Bentley |
| 2008/0022281 A1 | 1/2008 | Dubhashi et al. |
| 2008/0033742 A1 | 2/2008 | Bernasconi |
| 2008/0046351 A1 | 2/2008 | Wiener et al. |
| 2008/0052182 A1 | 2/2008 | Marshall |
| 2008/0052244 A1 | 2/2008 | Tsuei et al. |
| 2008/0059317 A1 | 3/2008 | Chandran et al. |
| 2008/0059352 A1 | 3/2008 | Chandran |
| 2008/0059364 A1 | 3/2008 | Tidwell et al. |
| 2008/0086400 A1 | 4/2008 | Ardelean et al. |
| 2008/0091519 A1 | 4/2008 | Foss |
| 2008/0097768 A1 | 4/2008 | Godshalk |
| 2008/0103959 A1 | 5/2008 | Carroll et al. |
| 2008/0103972 A1 | 5/2008 | Lanc |
| 2008/0109315 A1 | 5/2008 | Huang et al. |
| 2008/0109740 A1 | 5/2008 | Prinsen et al. |
| 2008/0109875 A1 | 5/2008 | Kraft |
| 2008/0115191 A1 | 5/2008 | Kim et al. |
| 2008/0120133 A1 | 5/2008 | Krishnaswami et al. |
| 2008/0162383 A1 | 7/2008 | Kraft |
| 2008/0172324 A1 | 7/2008 | Johnson |
| 2008/0177655 A1 | 7/2008 | Zalik |
| 2008/0184270 A1 | 7/2008 | Cole et al. |
| 2008/0189202 A1 | 8/2008 | Zadoorian et al. |
| 2008/0195548 A1 | 8/2008 | Chu et al. |
| 2008/0201257 A1 | 8/2008 | Lewis et al. |
| 2008/0205655 A1 | 8/2008 | Wilkins et al. |
| 2008/0205774 A1 | 8/2008 | Brinker et al. |
| 2008/0208610 A1 | 8/2008 | Thomas et al. |
| 2008/0208726 A1 | 8/2008 | Tsantes et al. |
| 2008/0208873 A1 | 8/2008 | Boehmer |
| 2008/0221972 A1 | 9/2008 | Megdal et al. |
| 2008/0222015 A1 | 9/2008 | Megdal et al. |
| 2008/0222027 A1 | 9/2008 | Megdal et al. |
| 2008/0222706 A1 | 9/2008 | Renaud et al. |
| 2008/0255922 A1 | 10/2008 | Feldman et al. |
| 2008/0263058 A1 | 10/2008 | Peden |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0288283 A1 | 11/2008 | Baldwin, Jr. et al. |
| 2008/0294501 A1 | 11/2008 | Rennich et al. |
| 2008/0294540 A1 | 11/2008 | Celka et al. |
| 2008/0301016 A1 | 12/2008 | Durvasula et al. |
| 2008/0306750 A1 | 12/2008 | Wunder et al. |
| 2008/0319832 A1 | 12/2008 | Liebe |
| 2008/0319889 A1 | 12/2008 | Hammad |
| 2008/0319909 A1 | 12/2008 | Perkins et al. |
| 2009/0012889 A1 | 1/2009 | Finch |
| 2009/0024428 A1 | 1/2009 | Hudock, Jr. |
| 2009/0030776 A1 | 1/2009 | Walker et al. |
| 2009/0031426 A1 | 1/2009 | Dal Lago et al. |
| 2009/0043691 A1 | 2/2009 | Kasower |
| 2009/0044279 A1 | 2/2009 | Crawford et al. |
| 2009/0055322 A1 | 2/2009 | Bykov et al. |
| 2009/0055894 A1 | 2/2009 | Lorsch |
| 2009/0060343 A1 | 3/2009 | Rosca |
| 2009/0089190 A1 | 4/2009 | Girulat |
| 2009/0094674 A1 | 4/2009 | Schwartz et al. |
| 2009/0112650 A1 | 4/2009 | Iwane |
| 2009/0119199 A1 | 5/2009 | Salahi |
| 2009/0138335 A1 | 5/2009 | Lieberman |
| 2009/0150166 A1 | 6/2009 | Leite et al. |
| 2009/0150238 A1 | 6/2009 | Marsh et al. |
| 2009/0158030 A1 | 6/2009 | Rasti |
| 2009/0164232 A1 | 6/2009 | Chmielewski et al. |
| 2009/0164380 A1 | 6/2009 | Brown |
| 2009/0172815 A1 | 7/2009 | Gu et al. |
| 2009/0222308 A1 | 9/2009 | Zoldi et al. |
| 2009/0222379 A1 | 9/2009 | Choudhuri et al. |
| 2009/0234775 A1 | 9/2009 | Whitney et al. |
| 2009/0240624 A1 | 9/2009 | James et al. |
| 2009/0248573 A1 | 10/2009 | Haggerty et al. |
| 2009/0254971 A1 | 10/2009 | Herz et al. |
| 2009/0271248 A1 | 10/2009 | Sherman et al. |
| 2009/0271265 A1 | 10/2009 | Lay et al. |
| 2009/0276244 A1 | 11/2009 | Baldwin, Jr. et al. |
| 2009/0289110 A1 | 11/2009 | Regen et al. |
| 2009/0328173 A1 | 12/2009 | Jakobson et al. |
| 2010/0009663 A1 | 1/2010 | Chang |
| 2010/0010930 A1 | 1/2010 | Allen |
| 2010/0011428 A1 | 1/2010 | Atwood et al. |
| 2010/0023434 A1 | 1/2010 | Bond |
| 2010/0023448 A1 | 1/2010 | Eze |
| 2010/0030677 A1 | 2/2010 | Melik-Aslanian et al. |
| 2010/0042517 A1 | 2/2010 | Paintin et al. |
| 2010/0042583 A1 | 2/2010 | Gervais |
| 2010/0049803 A1 | 2/2010 | Ogilvie et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0122316 A1 | 5/2010 | Lyon |
| 2010/0142698 A1 | 6/2010 | Spottiswoode et al. |
| 2010/0145836 A1 | 6/2010 | Baker et al. |
| 2010/0174638 A1 | 7/2010 | Debie et al. |
| 2010/0185546 A1 | 7/2010 | Pollard |
| 2010/0188684 A1 | 7/2010 | Kumara |
| 2010/0205087 A1 | 8/2010 | Hubler et al. |
| 2010/0217837 A1 | 8/2010 | Ansari et al. |
| 2010/0223168 A1 | 9/2010 | Haggerty et al. |
| 2010/0228658 A1 | 9/2010 | Ketelsen et al. |
| 2010/0250411 A1 | 9/2010 | Ogrodski |
| 2010/0250497 A1 | 9/2010 | Redlich et al. |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0262535 A1 | 10/2010 | Lent et al. |
| 2010/0268660 A1 | 10/2010 | Ekdahl |
| 2010/0293090 A1 | 11/2010 | Domenikos et al. |
| 2010/0299262 A1 | 11/2010 | Handler |
| 2010/0325035 A1 | 12/2010 | Hilgers et al. |
| 2011/0029427 A1 | 2/2011 | Haggerty et al. |
| 2011/0035315 A1 | 2/2011 | Langley |
| 2011/0040736 A1 | 2/2011 | Kalaboukis |
| 2011/0054981 A1 | 3/2011 | Faith et al. |
| 2011/0060654 A1 | 3/2011 | Elliott et al. |
| 2011/0125632 A1 | 5/2011 | Neel |
| 2011/0126275 A1 | 5/2011 | Anderson et al. |
| 2011/0131123 A1 | 6/2011 | Griffin et al. |
| 2011/0161218 A1 | 6/2011 | Swift |
| 2011/0166988 A1 | 7/2011 | Coulter |
| 2011/0173116 A1 | 7/2011 | Yan et al. |
| 2011/0178841 A1 | 7/2011 | Rane et al. |
| 2011/0178899 A1 | 7/2011 | Huszar |
| 2011/0184838 A1 | 7/2011 | Winters et al. |
| 2011/0196791 A1 | 8/2011 | Dominguez |
| 2011/0270779 A1 | 11/2011 | Showalter |
| 2011/0270925 A1 | 11/2011 | Mina |
| 2012/0005070 A1 | 1/2012 | McFall et al. |
| 2012/0023011 A1 | 1/2012 | Hurwitz |
| 2012/0030771 A1 | 2/2012 | Pierson et al. |
| 2012/0066065 A1 | 3/2012 | Switzer |
| 2012/0066084 A1 | 3/2012 | Sneyders |
| 2012/0072464 A1 | 3/2012 | Cohen |
| 2012/0101938 A1 | 4/2012 | Kasower |
| 2012/0101939 A1 | 4/2012 | Kasower |
| 2012/0108274 A1 | 5/2012 | Acebo Ruiz et al. |
| 2012/0109990 A1 | 5/2012 | Yamasaki |
| 2012/0123942 A1 | 5/2012 | Song et al. |
| 2012/0136763 A1 | 5/2012 | Megdal et al. |

(56) References Cited

U.S. PATENT DOCUMENTS

| | | |
|---|---|---|
| 2012/0136774 A1 | 5/2012 | Imrey et al. |
| 2012/0150678 A1 | 6/2012 | Dyor |
| 2012/0158574 A1 | 6/2012 | Brunzell et al. |
| 2012/0158654 A1 | 6/2012 | Behren et al. |
| 2012/0173406 A1 | 7/2012 | Fei et al. |
| 2012/0173417 A1 | 7/2012 | Lohman et al. |
| 2012/0198556 A1 | 8/2012 | Patel et al. |
| 2012/0204026 A1 | 8/2012 | Shi et al. |
| 2012/0215682 A1 | 8/2012 | Lent et al. |
| 2012/0226916 A1 | 9/2012 | Hahn et al. |
| 2012/0232958 A1 | 9/2012 | Silbert |
| 2012/0239553 A1 | 9/2012 | Gonen et al. |
| 2012/0239583 A1 | 9/2012 | Dobrowolski |
| 2012/0246060 A1 | 9/2012 | Conyack, Jr. et al. |
| 2012/0253852 A1 | 10/2012 | Pourfallah et al. |
| 2012/0265607 A1 | 10/2012 | Belwadi |
| 2012/0284118 A1 | 11/2012 | Mamich, Jr. et al. |
| 2012/0290660 A1 | 11/2012 | Rao et al. |
| 2012/0317016 A1 | 12/2012 | Hughes |
| 2012/0324388 A1 | 12/2012 | Rao et al. |
| 2013/0018811 A1 | 1/2013 | Britti et al. |
| 2013/0031624 A1 | 1/2013 | Britti et al. |
| 2013/0060603 A1 | 3/2013 | Wagner |
| 2013/0066775 A1 | 3/2013 | Milam |
| 2013/0110565 A1 | 5/2013 | Means et al. |
| 2013/0117087 A1 | 5/2013 | Coppinger |
| 2013/0124263 A1 | 5/2013 | Amaro et al. |
| 2013/0173449 A1 | 7/2013 | Ng et al. |
| 2013/0173451 A1 | 7/2013 | Kornegay et al. |
| 2013/0185293 A1 | 7/2013 | Boback |
| 2013/0205135 A1 | 8/2013 | Lutz |
| 2013/0211986 A1 | 8/2013 | Debie et al. |
| 2013/0226706 A1 | 8/2013 | Haggerty et al. |
| 2013/0226753 A1 | 8/2013 | Haggerty et al. |
| 2013/0226779 A1 | 8/2013 | Haggerty et al. |
| 2013/0226782 A1 | 8/2013 | Haggerty et al. |
| 2013/0268357 A1 | 10/2013 | Heath |
| 2013/0332338 A1 | 12/2013 | Yan et al. |
| 2013/0332342 A1 | 12/2013 | Kasower |
| 2013/0332467 A1 | 12/2013 | Bornea et al. |
| 2013/0339249 A1 | 12/2013 | Weller et al. |
| 2014/0032265 A1 | 1/2014 | Paprocki et al. |
| 2014/0032300 A1 | 1/2014 | Zhang et al. |
| 2014/0032723 A1 | 1/2014 | Nema |
| 2014/0061302 A1 | 3/2014 | Hammad |
| 2014/0089167 A1 | 3/2014 | Kasower |
| 2014/0110477 A1 | 4/2014 | Hammad |
| 2014/0136422 A1 | 5/2014 | Jung et al. |
| 2014/0156500 A1 | 6/2014 | Lassen et al. |
| 2014/0156501 A1 | 6/2014 | Howe |
| 2014/0156503 A1 | 6/2014 | Lassen et al. |
| 2014/0157375 A1 | 6/2014 | Britti et al. |
| 2014/0258083 A1 | 9/2014 | Achanta et al. |
| 2014/0279329 A1 | 9/2014 | Dancel |
| 2015/0254329 A1 | 9/2015 | Agarwal et al. |
| 2015/0269506 A1 | 9/2015 | Britti et al. |
| 2015/0278944 A1 | 10/2015 | Searson et al. |
| 2015/0287091 A1 | 10/2015 | Koran |
| 2015/0295906 A1 | 10/2015 | Ufford et al. |
| 2015/0310543 A1 | 10/2015 | DeBie |
| 2015/0339769 A1 | 11/2015 | deOliveira et al. |
| 2016/0055487 A1 | 2/2016 | Votaw et al. |
| 2016/0071175 A1 | 3/2016 | Reuss et al. |
| 2016/0092997 A1 | 3/2016 | Shen et al. |
| 2017/0041296 A1 | 2/2017 | Ford et al. |
| 2017/0046526 A1* | 2/2017 | Chan .................. H04L 9/0861 |
| 2017/0046652 A1* | 2/2017 | Haldenby ........... H04L 63/0876 |
| 2017/0046664 A1* | 2/2017 | Haldenby ........... G06Q 20/405 |
| 2017/0046693 A1* | 2/2017 | Haldenby ........... G06Q 20/4016 |
| 2017/0048021 A1 | 2/2017 | Yanovsky et al. |
| 2017/0061138 A1 | 3/2017 | Lambert |
| 2017/0109735 A1 | 4/2017 | Sheng et al. |
| 2017/0200223 A1 | 7/2017 | Kasower |
| 2017/0249481 A1 | 8/2017 | Edison |
| 2017/0278182 A1 | 9/2017 | Kasower |
| 2017/0300627 A1* | 10/2017 | Giordano ............ G06F 21/6245 |
| 2018/0060596 A1 | 3/2018 | Hamel et al. |
| 2018/0060600 A1* | 3/2018 | Hamel ................. H04L 9/0891 |
| 2018/0062835 A1* | 3/2018 | Hamel ................. H04L 9/0822 |
| 2018/0075527 A1 | 3/2018 | Nagla et al. |
| 2018/0183768 A1* | 6/2018 | Lobban ................ H04L 63/061 |
| 2018/0204279 A1 | 7/2018 | Painter et al. |
| 2018/0205707 A1 | 7/2018 | Bellala et al. |
| 2018/0218069 A1 | 8/2018 | Rege et al. |
| 2018/0239914 A1 | 8/2018 | Chen et al. |
| 2018/0253702 A1 | 9/2018 | Dowding |
| 2018/0276661 A1 | 9/2018 | van Wingerden |
| 2018/0302215 A1* | 10/2018 | Salgueiro ........... H04L 63/0428 |
| 2018/0309567 A1 | 10/2018 | Wooden |
| 2019/0147544 A1 | 5/2019 | Pecoraro et al. |
| 2019/0251558 A1 | 8/2019 | Liu et al. |
| 2019/0288850 A1* | 9/2019 | Beecham ........... G06F 21/6209 |
| 2019/0333142 A1 | 10/2019 | Thomas |
| 2019/0347627 A1 | 11/2019 | Lin et al. |
| 2020/0143363 A1 | 5/2020 | Schmidt |
| 2020/0153627 A1 | 5/2020 | Wentz |
| 2020/0211103 A1 | 7/2020 | Searson et al. |
| 2020/0226284 A1 | 7/2020 | Yin |
| 2020/0349639 A1 | 11/2020 | Mousseau |
| 2021/0065160 A1 | 3/2021 | Butvin et al. |
| 2022/0138238 A1 | 5/2022 | Rege et al. |

FOREIGN PATENT DOCUMENTS

| | | |
|---|---|---|
| CN | 102663650 | 9/2012 |
| EP | 0 554 083 | 8/1993 |
| EP | 0 919 942 | 6/1999 |
| EP | 1 028 401 | 8/2000 |
| EP | 1 988 501 | 11/2008 |
| GB | 1 322 809 | 7/1973 |
| KR | 10-2004-0078798 | 9/2004 |
| KR | 10-2013-0107394 | 10/2013 |
| RU | 2 181 216 | 4/2002 |
| WO | WO 94/012943 | 6/1994 |
| WO | WO 95/012857 | 5/1995 |
| WO | WO 99/046710 | 9/1999 |
| WO | WO 00/055778 | 9/2000 |
| WO | WO 00/065469 | 11/2000 |
| WO | WO 01/004821 | 1/2001 |
| WO | WO 01/039589 | 6/2001 |
| WO | WO 01/041355 | 6/2001 |
| WO | WO 01/084281 | 11/2001 |
| WO | WO 02/013047 | 2/2002 |
| WO | WO 02/071176 | 9/2002 |
| WO | WO 2004/114160 | 12/2004 |
| WO | WO 2005/022348 | 3/2005 |
| WO | WO 2005/124619 | 12/2005 |
| WO | WO 2006/099081 | 9/2006 |
| WO | WO 2007/004158 | 1/2007 |
| WO | WO 2007/106393 | 9/2007 |
| WO | WO 2008/021061 | 2/2008 |
| WO | WO 2008/147918 | 12/2008 |
| WO | WO 2009/117468 | 9/2009 |
| WO | WO 2013/009920 | 1/2013 |
| WO | WO 2013/066633 | 5/2013 |
| WO | WO 2014/088895 | 6/2014 |
| WO | WO 2014/137759 | 9/2014 |
| WO | WO 2018/144612 | 8/2018 |
| WO | WO 2020/146667 | 7/2020 |
| WO | WO 2023/081165 | 5/2023 |

OTHER PUBLICATIONS

U.S. Appl. No. 12/705,511, filed Feb. 12, 2010, Bargoli et al.
"A New Approach to Fraud Solutions", BasePoint Science Solving Fraud, pp. 8, 2006.
"ACS Company Birch & Davis Wins Texas CHIP Contract," PR Newswire, Section: Financial News, May 17, 2000, Dallas, TX, pp. 3.
Aharony et al., "Social Area Networks: Data Networking of the People, by the People, for the People," 2009 International Conference on Computational Science and Engineering, May 2009, pp. 1148-1155.

(56) References Cited

OTHER PUBLICATIONS

"An Even Better Solution to Financing Elective Surgery . . . ", Unicorn Financial, pp. 7, http://web.archive.org/web/20000816161359/ http://www.unicornfinancial.com/, as downloaded Oct. 15, 2008.
"Authorizing Safety Net Public Health Programs," Hearing before the Subcommittee on Health of theCommittee on Energy and Commerce, House of Representatives, One Hundred Seventh Congress, First Session, Serial No. 107-57, dated Aug. 1, 2001, 226 pgs.
An Expert System for Determining Medicaid Eligibility, Journal of Medical Systems, vol. 12, Nov. 5, 1988, in 10 pages.
Announcing TrueProfiler, http://web.archive.org/web/20021201123646/ http://www.truecredit.com/index.asp, dated Dec. 1, 2002, 1 page.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Antonopoulos, Andreas M., "Mastering Bitcoin: Unlocking Digital Crypto-Currencies", O'Reilly, Dec. 2014, First Edition, pp. 282.
Barry, Ellen, "Life, Liberty, and the Pursuit of Lipo," The Boston Phoenix, News & Opinion, dated Apr. 6, 1998, as downloaded at http://weeklywire.com/ww/04-6-98/boston_feature_1.html (1 of 12) [Oct. 15, 2008 2:35:25 PM].
Belford, Terrence, "Technology Quarterly: Computers, Internet Speeds Credit Checks System Tailored for Doctors, Dentists," The Globe and Mail (Canada), Section: Report on Business Special Reports, p. C10, Mar. 18, 1997.
"Beverly Hills Man Convicted of Operating 'Bust-Out' Schemes that Caused More than $8 Million in Losses", Department of Justice, Jul. 25, 2006, 2 Pgs.
Bienkowski, Nik, "A New Tool for Portfolio Risk Management—Gold Bullion", Apr. 2003, pp. 6.
"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip. htm (1 of 3) [Oct. 20, 2008 9:49:18 AM].
Boss, Shira J. "Elective Surgery Without the Plastic: Low-Interest Medical Financing Provides Alternative to Credit Cards," factiva, Crain's New York Business, 2 pgs., dated Jun. 22, 1998.
Broward County CAP Grant Application, as printed on Aug. 10, 2009, 41 pgs.
Burr Ph.D., et al., "Utility Payments as Alternative Credit Data: A Reality Check", Asset Builders of America, Inc., Oct. 5, 2006, pp. 1-18, Washington, D.C.
"Bust-Out Schemes", Visual Analytics Inc. Technical Product Support, Newsletter vol. 4, Issue 1, Jan. 2005, pp. 7.
Calnan, Christopher, "Tenet, Fair Isaac invest $20M in startup," MHT, Mass High Tech: The Journal of New England Technology, dated Jul. 23, 2007, 2 pgs.
Capps et al., "Recent Changes in Texas Welfare and Work, Child Care and Child Welfare Systems," Assessing the New Federalism, The Urban Institute, State Update No. 1, 24 pgs., Jun. 2001.
CAPStone Newsletter, Sep. 2001, 8 pgs., as downloaded from http://web.archive.org/web/20011213115738/www.capcommunity. hrsa.gov/Newsletter/Newsletter12.htm (1 of 8) [Oct. 18, 2008 2:39:47 PM].
Card Marketing, Use the Latest CRM Tools and Techniques, www. CardForum.com, vol. 5 No. 10, Dec. 2001.
Cheney, Karen, "Fix Your Nose, If You Wish, But Not With This New Loan," Money Magazine, vol. 27, No. 5, 1 pg., dated May 1, 1998.
CreditSesame; "FAQ's"; http://www.creditsesame.com/how-we-help/faqs/#cb printed Dec. 5, 2011 in 8 pages.
CreditSesame; "Promote Your Financial Responsibility to Get an Edge in Life"; http://www.creditsesame.com/credit-badge/ printed Dec. 2, 2011 in 1 page.
CreditToolkit, Digital Matrix Systems, as printed out Mar. 4, 2008, pp. 2.
"Credit Information Bureaus and 'CIBIL'", http://www.icicibank. com/cibil.html printed Aug. 22, 2012 in 3 pages.

"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/ data-loss-prevention/ printed Apr. 8, 2013 in 8 pages.
"Data Protection", http://compliantprocessing.com/data-protection/ printed Apr. 8, 2013 in 4 pages.
"Debt Settlement: Watch Video on how to Pay Your Debt Faster", http://www.debtconsolidationcare.com/debt-settlement.html printed Jan. 9, 2013 in 6 pages.
DentalFinancing.com, "Financial services for patients and dental professionals,", 7 pgs., as downloaded from http://web.archive.org/ web/20010607151954/www.dentalfinancing.com/dentist/index.asp (1 of 2) [Oct. 15, 2008 3:55:16 PM].
DiBartolomeo, Dan, "Portfolio Optimization: The Robust Solution," Prudential Securities Quantitative Conference, Dec. 21, 1993, pp. 8.
Dietz, Ellen, "Dental Office Management," 8 pgs. , pp. 316-321, Jul. 16, 1999.
Downes et al., Dictionary of Finance and Investment Terms, Fifth Edition, Nov. 1, 1998, pp. 332-333.
Dymi, Amilda, Need for Leads Spurs Some Upgrades, Origination News—Special Report, May 1, 2008, vol. vol. 17, Issue No. 8, Pages p. 24, Atlanta, Copyright 2008 SourceMedia, Inc.
eFunds Introduces QualiFileSM, Deluxe Corporation, eFunds Press Release and Product Launch, Sep. 23, 1999, Milwaukee, WI.
Electronic Privacy Information Center, "The Fair Credit Reporting Act" 15 USC 1681 (1992), 10 pgs., as downloaded from http://epic. org/privacy/financial/fcra.html on Mar. 19, 2008.
Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.
Equifax Consumer Credit Report http://www.equifax.com/home/, as retrieved on Sep. 17, 2008.
Ettorre, "Paul Kahn on Exceptional Marketing," Management Review, vol. 83, No. 11, Nov. 1994, pp. 48-51.
Expensr.com http://www.expensr.com/, as retrieved on Sep. 17, 2008.
Experian Consumer Credit Report http://www.experian.com/, as retrieved on Sep. 17, 2008.
Experian, Custom Strategist and Qualifile from Funds, Jun. 2000, in 2 pages.
Experian, "Enabling e-business", White Paper, Jan. 2001, pp. 21.
Experian, "Instant Prescreen: Offer preapproved credit at the point of sale", Oct. 2000, pp. 2, http://www.cdillinois.com/pdf_file/instant_ prescreen_ps.pdf.
Experian, "Experian Rental Payment Data," http://www.experian. com/rentbureau/rental-data.html printed Nov. 22, 2013 in 2 pages.
FamilySecure.com; "Identity Theft Protection for the Whole Family | FamilySecure.com" http://www.familysecure.com/, as retrieved on Nov. 5, 2009.
Fan et al., "Design of Customer Credit Evaluation System for E-Business", 2004 IEEE International Conference on Systems, Man and Cybernetics, 2004, pp. 392-397.
Felsenthal, Edward, "Health Costs; Managed Care Helps Curb Costs, Study Says," The Wall Street Journal, dated Aug. 12, 1991.
"Fictitious Business Name Records", Westlaw Database Directory, http://directory.westlaw.com/scope/default.asp?db=FBN-ALL &RS-W . . . &VR=2.0 as printed Dec. 17, 2009, pp. 5.
"Fighting the New Face of Fraud", FinanceTech, http://www. financetech.com/showArticle.jhtml?articleID=167100405, Aug. 2, 2005.
"Financing Medical Procedures A Lucrative But Risky Business," Credit Risk Management Report, vol. 10, Issue 15, 2 pgs., dated Aug. 7, 2000.

(56) References Cited

OTHER PUBLICATIONS

Fisher, Joseph, "Access to Fair Credit Reports: Current Practices and Proposed Legislation," American Business Law Journal, Fall 1981, vol. 19, No. 3, p. 319.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Gilje, Shelby, "Credit Agency Moving into Health Care," NewsRoom, The Seattle Times, Section: Scene, Mar. 22, 1995, pp. 3, http://web2.westlaw.com/result/documenttext.aspx?rs=WLW8.03&ss+CNT&rp=%2fWelc . . . .
Gionis et al., "Similarity Search in High Dimensions via Hashing", Sep. 7, 1999, pp. 518-529.
Giudici, Paolo, "Bayesian Data Mining, with Application to Benchmarking and Credit Scoring, " Applied Stochastic Models in Business and Industry, 2001, vol. 17, pp. 69-81.
"GLBA Compliance and FFIEC Compliance" http://www.trustwave.com/financial-services.php printed Apr. 8, 2013 in 1 page.
Goldstein, Jacob, "The Newest Vital Sign: Your Credit Score," The Wall Street Journal, Health Blog, as viewed at http://blogs.wsj.com/health/2008/03/18/the-newest-vital-sign-your-cr, Mar. 18, 2008, pp. 3.
Gualtieri et al., "The Forrester Wave™: Big Data Streaming Analytics, Q1 2016", Forrester®, Mar. 30, 2016, pp. 14, https://www.sas.com/content/dam/SAS/en_us/doc/analystreport/forrester-big-data-streaming-analytics-108218.pdf.
Henry, M.D., Kimberly A., "The Face-Lift Sourcebook," Oct. 11, 2000, 3 pgs. (p. 207).
Herron, Janna, "Social Media-Based Credit Score?", http://www.bankrate.com/financing/credit-cards/social-media-based-credit-score/, posted Friday, Jan. 13, 2012, printed Nov. 22, 2013 in 2 pages.
ID Analytics, "ID Analytics® Consumer Notification Service" printed Apr. 16, 2013 in 2 pages.
Ideon, Credit-Card Registry that Bellyflopped this Year, Is Drawing some Bottom-Fishers, The Wall Street Journal, Aug. 21, 1995, pp. C2.
"Improving the Implementation of State Children's Health Insurance Programs for Adolescents Report of an Invitational Conference Sponsored by the American Academy of Pediatrics, Section on Adolescent Health," Pediatrics, Official Journal of the American Academy of Pediatrics, Section on Adolescent Health, Sep. 26-27, 1999, 9 pages.
IndiCareTM, On-Line Patient Assistant Program, Website User's Manual, JBI Associates, LLC, Jan. 1997, pp. 17.
Kauffman et al., "Research Directions on the Role an Impact of ICT in Microfinance", Proceedings of the 43rd Hawaii International Conference on System Sciences, 2010, pp. 10.
Kent, Heather, "Huge declines in price as competition heats up in Vancouver's booming laser-surgery market," CMAJ, Oct. 5, 1999; 161 (7), pp. 857-858.
Lan, Joe, "The Top Portfolio Management Software," http://www.aaii.com/computerizedinvesting/article/the-top-portfolio-management-software, Includes Discussion thread, Fourth Quarter 2011, pp. 17.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lavelle, Marianne, "Health Plan Debate Turning To Privacy Some Call for Safeguards On Medical Disclosure. Is a Federal Law Necessary?," The National Law Journal, vol. 16, No. 39, dated May 30, 1994, as downloaded from http://web2.westlaw.com/result/.
Lendingtree.com, "Lender Ratings & Reviews," http://web.archive.org/web/20091015043716/http://www.lendingtree.com/lender-reviews/, Oct. 15, 2009, in 21 pages.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
Littwin, Angela, "Beyond Usury: A Study of Credit-Card Use and Preference Among Low-Income Consumers", Texas Law Review, vol. 86, No. 3, pp. 451-506; Feb. 2008.
Lorette, Kristie, "How to Successfully Dispute Inaccuracies on Your Credit Report," http://web.archive.org/web/20110531184149/http://www.quizzle.com/blog/2011/03/how-to-successfully-dispute-inaccuracies-on-your-credit-report/, Mar. 25, 2011, in * pages.
Magid, Lawrence, J., Business Tools: When Selecting an ASP Ensure Data Mobility, Los Angeles Times, Los Angeles, CA, Feb. 26, 2001, vol. C, Issue 4, pp. 3.
Mathematica Policy Research, Inc., "1998 Health Care Survey of DoD Beneficiaries: Technical Manual," Jul. 1999.
McGovern, Celeste, Jayhawk Medical Acceptance. (Brief Article), Alberta Report, 1 pg., dated Aug. 23, 1999.
McLaughlin, Nancy H., "Homeless, pregnant and alone Dana Sides knows her baby is likely to come in a month, but she has no idea where she will go after leaving the hospital," NewsRoom, Greensboro News & Record (NC), Section: General News, dated Dec. 6, 2001.
"MediCredit Announces Major Investment from Medstone; Financing Will Enable Dramatic Expansion of Online Services," Business Wire, pp. 2, dated May 12, 2000.
MediCredit, Patient Financing, "Thought you couldn't afford Cosmetic Surgery?," 3 pgs., as downloaded from http://web.archive.org/web/19970601060333/http://www.medicredit.com/ (1 of 2) [Oct. 15, 2008 3:16:31 PM].
Medick et al., "German Agency to Mine Facebook to Assess Creditworthiness", Jun. 7, 2012, http://www.spiegel.de/international/germany/german-credit-agency-plans-to-analyze-individual-facebook-pages-a-837539.html printed Nov. 22, 2013 in 2 pages.
Menge, Falko, "Enterprise Service Bus", Free and Open Source Software Conference, 2007, pp. 6.
Merriam Webster's Collegiate Dictionary, 10th Edition, Jan. 1, 1993, p. 79.
MicroBilt, "PRBC Credit Reporting Agency—Payment Reporting Builds Credit," retrieved from http://www.microbilt.com/nontraditional-credit-report.aspx and corresponding "Sample Report," retrieved from http://www.microbilt.com/pdfs/PRBC%20Sample%20Report%20(complete).pdf printed Nov. 21, 2013 in 8 pages.
Microfinance Africa, "Philippines: Microfinance Players to get Their Own Credit Info Bureau," Apr. 5, 2011, http://microfinanceafrica.net/microfinance-around-the-world/philippines-microfinance-players-to-get-their-own-credit-info-bureau/ printed Nov. 22, 2013 in 2 pages.
Mint.com, http://www.mint.com/ printed Sep. 18, 2008 in 2 pages.
MS Money Software by Microsoft http://www.microsoft.com/Money/default.mspx as retrieved on Sep. 17, 2008 in 1 page.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directory.westlaw.com/scope/default.asp?db=NA-ALL&RS=W . . . &VR=2.0 as printed Dec. 17, 2009, pp. 5.
NewsRoom, "CIGNA Report Withdrawn As Foe Sees Opening," Insurance Regulator, State Survey, Sep. 9, 1996, vol. 8, Issue 34, pp. 4.

(56) References Cited

OTHER PUBLICATIONS

"New for Investors: Asset Allocation, Seasoned Returns and More," Prosper, http://blog.prosper.com/2011/10/27/new-for-investors-asset-allocation-seasoned-returns-and-more/, Oct. 27, 2011, pp. 4.

Next Card: About Us, http://web.cba.neu.edu/~awatson/NextCardCase/NextCardAboutUs.htm printed Oct. 23, 2009 in 10 pages.

Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.

Pagano, et al., "Information Sharing in Credit Markets," Dec. 1993, The Journal of Finance, vol. 48, No. 5, pp. 1693-1718.

Partnoy, Frank, Rethinking Regulation of Credit Rating Agencies: An Institutional Investor Perspective, Council of Institutional Investors, Apr. 2009, pp. 21.

Paustian, Chuck, "Every Cardholder a King Customers get the Full Treatment at Issuers' Web Sites," Card Marketing, New York, Mar. 2001, vol. 5, No. 3, pp. 4.

Pennsylvania Law Weekly, "Discriminating Against Victims Admitting Domestic Abuse Can Lead to Denial of Insurance Coverage," vol. XVIII, No. 26, dated Jun. 26, 1996, 2 pgs., as downloaded from http://web2.westlaw.com/result/documenttext.aspx?rs=WLW8.

Phinisee, Tamarind, "Banks, FTC Step Up Efforts to Address Identity Theft", San Antonio Business Journal; San Antonio, Jul. 5, 2002, vol. 16, No. 24, pp. 5.

Planet Receipt—Home, http://www.planetreceipt.com/home printed Oct. 16, 2012 in 1 page.

Planet Receipt—Solutions & Features, http://www.planetreceipt.com/solutions-features printed Oct. 16, 2012 in 2 pages.

"Qualifying For Debt Settlement", http://www.certifieddebt.com/debt/settlement-qualifications.shtml printed Jan. 9, 2013 in 2 pages.

Quantix Software, "Investment Account Manager," available at https://www.youtube.com/watch?v=1UwNTEER1Kk, as published Mar. 21, 2012.

Quicken Online by Intuit http://www.quicken.intuit.com/, as retrieved on Sep. 17, 2008.

"Quicken Support", http://web.archive.org/web/20071231040130/http://web.intuit.com/support/quicken/docs/d_qif.html as archived Dec. 31, 2007 in 6 pages.

Ramaswamy, Vinita M., Identity-Theft Toolkit, The CPA Journal, Oct. 1, 2006, vol. 76, Issue 10, pp. 66-70.

RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007.

"Recognition and use by Appraisers of Energy-Performance Benchmarking Tools for Commercial Buildings," prepared by the Institute for Market Transformation, NYSERDA, Feb. 2003, pp. 6.

Repici et al., "The Comma Separated Value (CSV) File Format", http://creativyst.com/Doc/Articles/CSV/CSV01.htm, Creativyst, Inc., 2002, pp. 10.

"Resolve Debt for Less: With Help from Freedom Financial" http://www.debtsettlementusa.com/ printed Jan. 9, 2013 in 6 pages.

Roth, Andrew, "CheckFree to Introduce E-Mail Billing Serving," American Banker, New York, Mar. 13, 2001, vol. 166, No. 49, pp. 3.

Rubin, Rita, "Cosmetic Surgery On Credit, Finance plans let patients reconstruct now, pay later," The Dallas Morning News, 2 pgs., dated Sep. 10, 1988.

Screenshot for Investment Account Manager v.2.8.3, published at http://www.aaii.com/objects/get/1642.gif by at least Aug. 30, 2011 in 1 page.

SearchAmerica, "Payment Advisor Suite TM", Solutions, 2009, pp. 2.

Selz, Michael, "Lenders Find Niche In Cosmetic Surgery That Isn't Insured—But Since You Can't Repossess A Nose Job, Risks Aren't Restricted to the Patients," Wall Street Journal, New York, N.Y., Jan. 1997, p. A.1, 3 pgs.

"Settling Your Debts—Part 1 in Our Debt Settlement Series", http://www.creditinfocenter.com/debt/settle_debts.shtml printed Jan. 9, 2013 in 6 pages.

ShoeBoxed, https://www.shoeboxed.com/sbx-home/ printed Oct. 16, 2012 in 4 pages.

Simpson, Glyn, "Microsoft (MS) Money, MSMoney FAQ, Help and Information Pages", pp. 2, Copyright © Glyn Simpson 1998-2007, http://web.archive.org/web/20071018075531/http://money.mvps.org/faq/article/196.aspx.

"StarNet Financial, Inc. Acquires Proprietary Rights to Sub-Prime Underwriting System Through Strategic Alliance With TRAkkER Corporation", PR Newswire, Dallas, TX, Sep. 13, 1999.

State of Wisconsin, Division of Health Care Financing, Department of Health and Family Services: 1999-2001 Biennial Report, pp. 17-21.

Stein, Benchmarking Default Prediction Models: Pitfalls and Remedies in Model Validation, Moody's KMV, Revised Jun. 13, 2002, Technical Report #020305; New York.

Sumner, Anthony, "Tackling The Issue of Bust-Out Fraud", Experian: Decision Analytics, Dec. 18, 2007, pp. 24.

Sumner, Anthony, "Tackling The Issue of Bust-Out Fraud", e-News, Experian: Decision Analytics, pp. 4, [Originally Published in Retail Banker International Magazine Jul. 24, 2007].

Texas Department of Human Services, 1999 Annual Report, 60 Years of Progress, Medial Services 9P137, Publication No. DHS-600-FY99.

thatlook.com, Cosmetic Surgery Financing, 3 pgs, as downloaded from http://web.archive.org/web/200001214113900/www.thatlook.com/cosmetic_surgery_financing.cfm (1 of 2) [Oct. 15, 2008 4:11:47 PM].

Thomas, David, "Report on Networks and Electronic Communications Newcourt Credit Turns to Extranet Services / A PC Connects To 1,200 Users At Once", The Globe and Mail (Canada), Section: Report on Business Special Report, Nov. 12, 1996, pp. 2.

TRAkkER Corporation website, trakkercorp.com, TRAkkER Software Description, May 26, 2000, available at http://web.archive.org/web/20000526234204/http://trakkercorp.com/page4.html.

TransUnion Consumer Credit Report http://www.transunion.com/, as retrieved on Sep. 17, 2008.

US Legal, Description, http://www.uslegalforms.com/us/US-00708-LTR.htm printed Sep. 4, 2007 in 2 pages.

Washington State Office of Public Defense, "Criteria and Standards for Determining and Verifying Indigency," dated Feb. 9, 2001.

Webpage printed from http://www.magnum.net/pdfs/RapUpBrochure.pdf as printed Mar. 3, 2008.

"We Eliminate Bad Debt", as printed from http://www.webcreditbureau.com/start/, dated Aug. 22, 2012, 1 Page.

"Web Site Fuels Elective Surgery Trend; The Complete Resource to Paying for Cosmetic Surgery, Laser Vision Correction and Cosmetic Dentistry," Business Wire, Apr. 7, 1999, pp. 2.

Wesabe.com http://www.wesabe.com/, as retrieved on Sep. 17, 2008.

White, Ron, "How Computers Work", Special 10th Anniversary, Seventh Edition, Que Corporation, Indianapolis, IN, Oct. 2003, pp. 23.

Wilson, Andrea, "Escaping the Alcatraz of Collections and Charge-Offs", http://www.transactionworld.net/articles/2003/october/riskMgmt1.asp, Oct. 2003.

Window on State Government, Susan Combs, Texas Comptroller of Public Accounts, Chapter 8: Health and Human Services, "Improve the Medicaid Eligibility Determination Process," 9 pgs., as downloaded Apr. 9, 2008 from http://www.window.state.tx.us/etexas2001/recommend/ch08.

Winsborough, William et al., "Automated Trust Negotiation", Conference: DARPA Information Survivability Conference and Exposition, DISCEX '00, Proceedings, vol. 1, Feb. 2000, pp. 15.

Wisconsin Department of Workforce Development, BadgerCare Medicaid Application Credit Report Authorization Form, dated Jun. 21, 2001, effective date, Jul. 1, 2001.

Wisconsin Department of Workforce Development, BadgerCare Medicaid Notification of Eligibility, dated Jul. 25, 2000, effective date, Jul. 1, 2000.

(56) References Cited

OTHER PUBLICATIONS

Wood, Greg, "Top Streaming Technologies for Data Lakes and Real-Time Data", http://blog.zaloni.com/top-streaming-technologies-for-data-lakes-and-real-time-data, Sep. 20, 2016 in 3 pages.
Zoot—Decision Engine, www.zootweb.com/decision_engine.html, as printed on Mar. 3, 2008.
Zoot—Pre-Built Standard Attributes, www.zootweb.com/credit_attributes.html as printed Mar. 3, 2008.
Official Communication in Australian Patent Application No. 2012281182, dated Jul. 8, 2014.
Official Communication in Australian Patent Application No. 2012281182, dated May 19, 2015.
Official Communication in Chinese Patent Application No. 201280041782.2, dated Mar. 4, 2016.
Official Communication in European Patent Application No. 12811546.6, dated Nov. 25, 2014.
Official Communication in European Patent Application No. 12811546.6, dated Sep. 18, 2015.
Official Communication in Indian Patent Application No. 490/DELNP/2014, dated Jun. 20, 2019.
Official Communication in Russian Patent Application No. 2014101674/08, dated Dec. 15, 2014.
International Search Report and Written Opinion for Application No. PCT/US2012/046316, dated Sep. 28, 2012.
International Preliminary Report on Patentability and Written Opinion for Application No. PCT/US2012/046316, dated Jan. 14, 2014.
Official Communication in Australian Patent Application No. 2013356451, dated Jun. 22, 2015.
Official Communication in Chinese Patent Application No. 201380006862.9, dated Aug. 2, 2016.
Official Communication in European Patent Application No. 13860724.7, dated May 21, 2015.
Official Communication in Russian Patent Application No. 2014127000, dated Dec. 23, 2015.
International Search Report and Written Opinion for Application No. PCT/US2013/072102, dated Apr. 18, 2014.
International Preliminary Report on Patentability and Written Opinion for Application No. PCT/US2013/072102, dated Jun. 9, 2015.
Official Communication in Australian Patent Application No. 2014203430, dated Aug. 15, 2015.
Official Communication in Chinese Patent Application No. 201480000626.0, dated Aug. 1, 2016.
Official Communication in European Patent Application No. 14733951.9, dated Sep. 11, 2015.
Official Communication in Russian Patent Application No. 2014127320, dated Jul. 5, 2016.
International Search Report and Written Opinion for Application No. PCT/US2014/019142, dated Jun. 20, 2014.
International Preliminary Report on Patentability and Written Opinion for Application No. PCT/US2014/019142, dated Sep. 17, 2015.
International Search Report and Written Opinion for Application No. PCT/US2017/048265, dated Dec. 5, 2017.
International Preliminary Report on Patentability in Application No. PCT/US2017/048265, dated Mar. 7, 2019.
Official Communication in Australian Patent Application No. 2018215082, dated Jan. 21, 2022.
Partial Supplementary European Search Report for Application No. EP12747205, dated May 14, 2020.
Extended European Search Report for Application No. EP12747205, dated Aug. 14, 2020.
Extended European Search Report for Application No. EP12747205, dated Feb. 11, 2022.
Official Communication in Indian Patent Application No. 201917029540, dated Jan. 7, 2022.
International Search Report and Written Opinion for Application No. PCT/US2018/016258, dated May 16, 2018.
International Preliminary Report on Patentability in Application No. PCT/US2018/016258, dated Aug. 15, 2019.
International Search Report and Written Opinion for Application No. PCT/US2020/012976, dated May 6, 2020.
International Preliminary Report on Patentability in Application No. PCT/US2020/012976, dated Jul. 22, 2021.
Provisional Application as filed in U.S. Appl. No. 60/168,272, dated Dec. 1, 1999 in 14 pages.
Provisional Application as filed in U.S. Appl. No. 60/168,276, dated Dec. 1, 1999 in 82 pages.
Provisional Application as filed in U.S. Appl. No. 60/213,367, dated Jun. 23, 2000 in 20 pages.
Application as filed in U.S. Appl. No. 09/653,595, dated Aug. 31, 2000.
International Search Report and Written Opinion for Application No. PCT/US2022/048616, dated Mar. 14, 2023.

\* cited by examiner

SYMMETRIC ENCRYPTION FOR PRIVATE SMART CONTRACTS AMONG MULTIPLE PARTIES IN A PRIVATE PEER-TO-PEER NETWORK

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND

Distributed ledgers have enabled new systems for networks of users to create a trusted network for tracking and verifying transactions. Bitcoin is one example of a distributed ledger system for managing a cryptocurrency.

Not all transactions lend themselves to a publicly reviewable ledger system, like Bitcoin. In some instances, a private peer-to-peer network may be established to protect the information stored in the ledger. In such implementations, a limited number of trusted entities participate to provide similar features to the public ledgers. Each entity may record ledger entries and validate entries to confirm entries as authentic. The ledger entries may be associated with a multi-step process. The collection of entries related to one instance of the process may be referred to as a smart contract. However, an entity in the peer-to-peer network may wish to protect the details of their transaction (in total or certain steps) while simultaneous reaping the benefit of the trusted network.

SUMMARY

The present disclosure describes systems and methods for providing a secure method of symmetric encryption for private smart contacts among multiple parties in a private peer-to-peer network.

The systems, methods, and devices of the disclosure each have several innovative aspects, no single one of which is solely responsible for the desirable attributes disclosed herein. In one innovative aspect system for secure distributed electronic ledgering is provided. The system includes a master encryption key store storing a plurality of master encryption keys associated with respective client devices; a distributed electronic ledger storing a record generated by a client device included in the client devices, where the record includes: a first portion including unencrypted metadata. The record includes second portion including an internal encryption key encrypted with a master encryption key. The records includes store also includes a third portion including a request for a service, the request encrypted with the internal encryption key. The system also includes a computer-readable memory storing executable instructions and one or more computer processors in communication with the computer-readable memory, where the one or more computer processors are configured to execute the executable instructions to at least: determine that the record has been added to the distributed electronic ledger based at least in part on the unencrypted metadata, retrieve the master encryption key from the master encryption key store based at least in part on the unencrypted metadata, decrypt the second portion of the record using the master encryption key to obtain the internal encryption key, decrypt the third portion of the record to obtain the request, transmit the request to a service selected based at least in part on the request, receive a response from the service, insert at least a portion of the response into the third portion of the record, encrypt the third portion of the record using an encryption key, and store the record in the distributed electronic ledger. Other embodiments of this aspect include corresponding computer systems, apparatus, and computer programs recorded on one or more computer storage devices, each configured to perform the actions of the methods.

In one innovative aspect a system for secure distributed electronic ledgering is provided. The system includes a computer-readable memory storing executable instructions and one or more computer processors in communication with the computer-readable memory, where the one or more computer processors are configured to execute the executable instructions. Upon execution the instructions cause the one or more computer processors to at least: determine that a record has been added to a distributed electronic ledger based at least in part on unencrypted metadata included in a first portion of the record, where the record further includes: (a) a second portion including an internal encryption key encrypted with a master encryption key, and (b) a third portion including a request for a service, the request encrypted with the internal encryption key; retrieve the master encryption key from a data store based at least in part on the unencrypted metadata; decrypt the second portion of the record using the master encryption key to obtain the internal encryption key; decrypt the third portion of the record to obtain the request; transmit the request to a service selected based at least in part on the request; receive a response from the service; insert at least a portion of the response into the third portion of the record; encrypt the third portion of the record using an encryption key; and store the record in the distributed electronic ledger. Other embodiments of this aspect include corresponding computer systems, apparatus, and computer programs recorded on one or more computer storage devices, each configured to perform the actions of the methods.

Implementations of the systems described may include one or more of the following features. The encryption key used for encrypting the third portion may include the internal encryption key. The one or more computer processors may be further configured to execute the executable instructions to at least: generate a revised internal encryption key in response to obtaining the internal encryption key; and encrypt the second portion of the record using the revised internal encryption key, and where the encryption key used for encrypting the third portion includes the revised internal encryption key. The distributed electronic ledger may be further configured to transmit the record via a network, such as a private peer-to-peer network, to a remote distributed electronic ledger hosted by one of the client devices. The one or more computer processors may be further configured to execute the executable instructions to at least: identify a set of records stored in the distributed electronic ledger including a value in respective unencrypted metadata portions; for individual records in the set of records, retrieve the master encryption key from the master encryption key store based at least in part on unencrypted metadata of a first portion of an individual record, decrypt a second portion of the individual record using the master encryption key to obtain an individual internal encryption key, decrypt a third portion of the individual record using the individual internal encryption key to obtain individual record payload data, and validate the individual record payload data. The one or more computer processors may be further configured to execute the executable instructions to at least: initiate a transfer of resources from a first source identified by the individual record payload data to a destination associated with the service. The innovative features described may include or be implemented by hardware, a method or process, or computer software on a computer-accessible medium.

DETAILED DESCRIPTION

Figure 1:
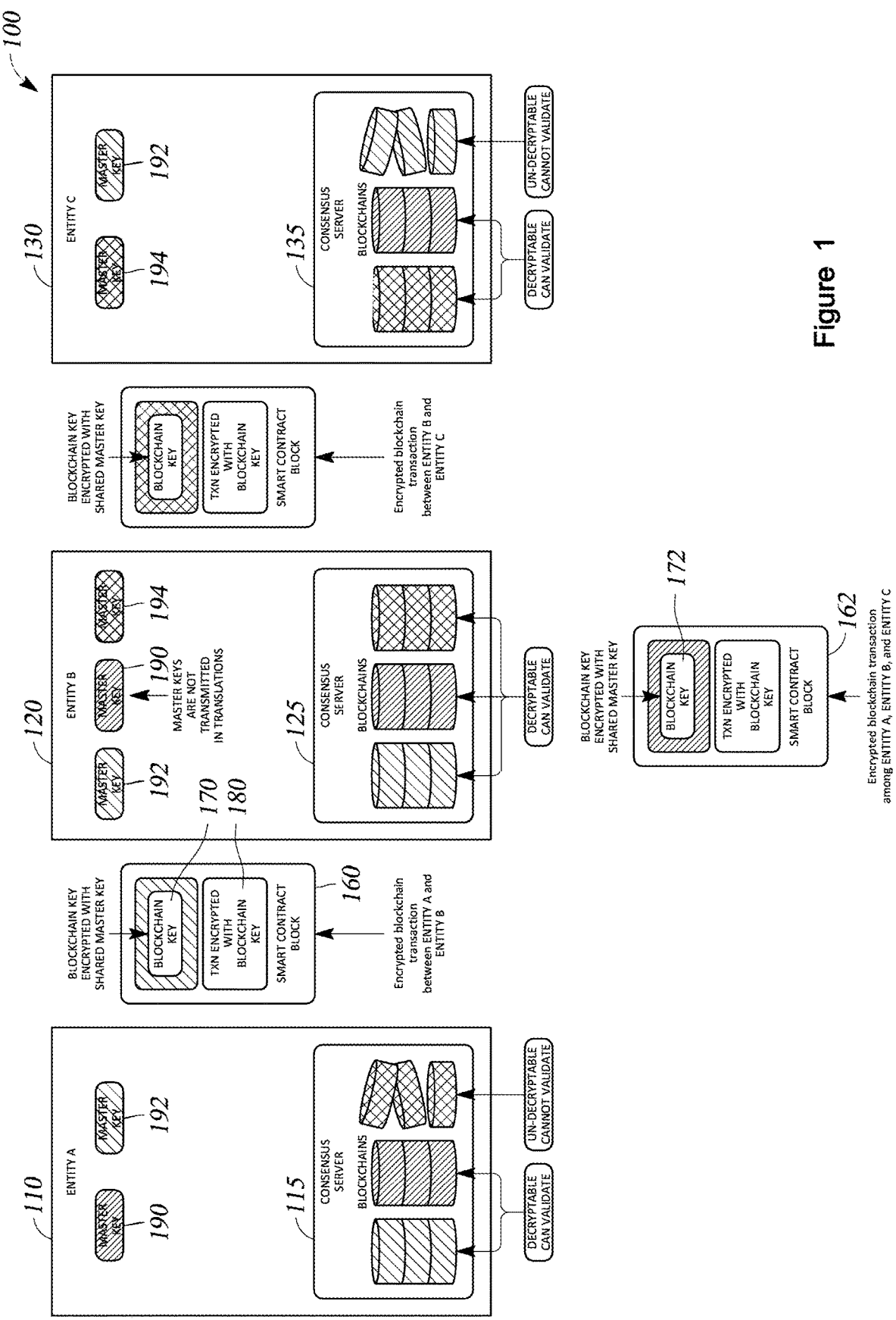
FIG. 1 is a block diagram illustrating an example private peer-to-peer network between three entities.

A master key, representing a unique blockchain ledger, may be shared among multiple participants in a private peer-to-peer network. Sharing of the master key may include communicating the master key in an encrypted message (e.g., email) using public key infrastructure (PKI). In some implementations, more complex distribution features may be includes such as quantum entanglement. A smart contract may be instantiated when requesting a service or data using a specific master key. The request may be submitted as an entry to the ledger with appropriate metadata and/or payload information for identifying and processing the request. On creation, the smart contract may include a randomly generated internal key that may remain private for the life of the smart contract. The internal key may be used to encrypt confidential data within the smart contract, and then the master key may, in turn, be used to encrypt the internal key. This process ensures that the smart contract can only be read and modified by participants of the smart contract holding the proper keys. Each participant has access to the shared master key. With exception of non-confidential transactional metadata, the smart contract remains opaque to other non-participating peers of the private blockchain network.

Master Key and Internal Key

Both the master key and internal key are a form of symmetric encryption; there is no public component as it occurs in PKI encryption.

Master keys may be shared between organizations participating in the private peer-to-peer network. Each master key may represent a blockchain ledger. Each transaction may use one and only one master key. The master key may be used to encrypt the internal key of the smart contract, after the internal key has encrypted the confidential elements of the blockchain contract (e.g., ledger record). The master key, along with metadata for the ledger record, may serve as a signature of each participating organization.

A master key preferably is associated with a unique identifier. Participant systems may use the unique identifier to optimize key identification and retrieval from each organization's key stores. Transmission of master keys outside of a peer's information security boundaries may be minimized or restricted to protect the integrity of the keys. Life-cycle management of the master key can be tied to business contracts and may be non-permanent. For example, a master key may be generated for transactions occurring within a period of time (e.g., monthly, quarterly, annually). A master key may represent a shared blockchain ledger that can be validated by peers who possess the master key. The master key may represent the shared blockchain ledger because without the appropriate master key, the block cannot be assembled into a chain and verified. Once decrypted using the associated master key, the block can be read and verified.

Internal keys are never exposed outside of a smart contract. Opening a smart contract may require the appropriate master key and identifying metadata that uniquely identifies the entity that can open the smart contract. This metadata could be the hash-hash of the public key that represents a blockchain account, or wallet, of the entity that is authorized to open the smart contract. Opening a smart contract with the appropriate master key may first decrypt the internal key. Once the internal key is decrypted, the internal key may be used to decrypt one or more confidential components of the smart contract.

Closing the smart contract is also performed using a master key. The master key may be used to encrypt the internal key after the internal key encrypts the smart contract data. The internal key may or may not be regenerated for improved security after a successful opening. The actual nature of the internal key may be completely opaque to all elements external to the smart contract. Providing the master key to close the contract can protect the internal key and also can be used as a signature of the transaction for "lite" verification/validation.

Private Peer-to-Peer Network

Unlike current implementations of digital currency, the private smart contracts, or blockchain blocks, described herein may be processed in a private peer-to-peer network. The network may include consensus servers, maintained by each peer, and coupled via secured communication links such as a virtual private network or tunneled network. The consensus servers may validate smart contracts between two or more peers. Validation may include confirming that the entries are authentic (e.g., entered by the party claiming to have authored the entry) and non-repudiated (e.g., not reversed or otherwise indicated as an error).

Each organization that participates in the private distributed, blockchain network may implement a consensus server. Each peer's consensus server may only have access to master keys for blockchain ledgers that the peer has a right to access. The right may be assigned by a central authority or through communications between entities. One or more master keys may be required to open, or decrypt the contract, for validation. For smart contracts associated with master keys that are not contained or associated with the organization, may be unreadable and thus cannot be validated by the organization. Such records may be dropped or excluded from validation by the unaffiliated organization. For example, some unencrypted metadata may be provided such as a token or identifier to retrieve the master key. Other metadata may be included for identification of a party or a transaction or a transaction type. For instance, in a contract between three or more parties, each party may want to know who updated a record and in what way. The metadata or a portion thereof may include an encrypted token that can only be decrypted by the token's owner. The encrypted metadata (e.g., private metadata) may not be used for blockchain verification. The private metadata may be used for identifying or confirming transactions. Other parties may the private metadata as base64-encoded data without understanding the true contents.

Because these blocks are secured using master keys, these blocks remain opaque to unauthorized parties without the appropriate master key(s).

A smart blockchain contract may include one or more of the following elements:

An embedded, non-retrievable, encrypted private key;

A confidential request for the execution of a credit-reporting service;

A confidential credit report, or payload, that fulfills the request;

Confidential metadata that describes the transaction; or

Non-confidential metadata used for routing, delivery, and fulfillment.

FIG. 1 is a block diagram illustrating an example private peer-to-peer network between three entities. The three entities shown in the private peer-to-peer network include Entity A 110, Entity B 120, and Entity C 130. Each entity may include its own instance of a consensus server (e.g., 115, 125, and 135, respectively). However, the information that can be validated may be limited to the records in the blockchains that relate to the entity. In this way, each entity can replicate records across the peer-to-peer network but retain privacy for individual records. Although not shown, Entity A 110, Entity B 120, and Entity C 130 may be in data communication via one or more of a wired or wireless network which may be public or private. In the case of a public network, the connection between the entities may be secured such as by using one or more of a virtual private network, tunneling, encryption, or other means to secure connections between the entities and data transmitted thereby.

FIG. 1 illustrates aspects of a system 100 for secure distributed electronic ledgering. The system 100 may include a master encryption key store storing a plurality of master encryption keys associated with respective client devices. The system 100 may include a distributed electronic ledger (e.g., blockchains) storing one or more records generated by the client device. A record may include a first portion including unencrypted metadata. The record may include a second portion including an internal encryption key ("blockchain key") encrypted with a master encryption key. The record may include a third portion including a request for a service, the request encrypted with the internal encryption key.

The system 100 may include a device such as a server or other electronic communication device. The electronic communication device may include or be coupled with a computer-readable memory storing executable instructions. One or more computer processors (e.g., of the device) may be in communication with the computer-readable memory. The one or more computer processors may be configured to execute the executable instructions to determine the record has been added to the distributed electronic ledger based at least in part on the unencrypted metadata, retrieve the master encryption key from the master encryption key store based at least in part on the unencrypted metadata, decrypt the second portion of the record using the master encryption key to obtain the internal encryption key, decrypt the third portion of the record to obtain the request, transmit the request to a service selected based at least in part on the request, receive a response from the service, insert at least a portion of the response into the third portion of the record, encrypt the third portion of the record using an encryption key, and store the record in the distributed electronic ledger.

The encryption key used for encrypting the third portion may include the internal encryption key. In some implementations, the internal encryption key may be a one-time-use key and, once used for decrypting, be discarded. In such implementations, the one or more computer processors may be further configured to execute the executable instructions to generate a revised internal encryption key in response to obtaining the internal encryption key and encrypt the second portion of the record using the revised internal encryption key. In such implementations, the encryption key used for encrypting the third portion may include the revised internal encryption key.

The distributed electronic ledger may be configured to transmit the record via a network to a remote distributed electronic ledger hosted by one of the client devices. This ensures that other trusted entities receive the records at least for replicated storage and, when authorized, remote validation. The network may include a private peer-to-peer network.

The one or more computer processors may be configured to execute the executable instructions to identify a set of records stored in the distributed electronic ledger including a value in respective unencrypted metadata portions. For individual records in the set of records, the processors may execute instructions to retrieve the master encryption key from the master encryption key store based at least in part on unencrypted metadata of a first portion of an individual record, decrypt a second portion of the individual record using the master encryption key to obtain an individual internal encryption key, decrypt a third portion of the individual record using the individual internal encryption key to obtain individual record payload data, and validate the individual record payload data. Validation may be dynamically assessed based on the smart contract. For example, a contract for a specified model can return a score while another model may return one thousand or more attributes (each of which may be requested separately). In such instances, each contract may include a validation code (e.g., a regular expression that tests the range of values). Validation may be similar to validating credit card transactions, where each party gets a chance to review transactions before reconciling the accounts. Unlike credit transactions though, each party gets to build the blockchains for independent real-time verification, regardless of when transaction is completed. In some implementations, real-time account reconciliation may be provided. The reconciliation may include guards or limits on the number of transactions or total cost associated with transactions.

In some implementations, the one or more computer processors may be further configured to execute the executable instructions to initiate a transfer of resources from a first source identified by the individual record payload data to a destination associated with the service.

Example Method of Contract Creation

The method of creating a smart contract 160 may be implemented by a computing device such as a consensus server and/or access device used to submit contract information to the consensus server. Entity A 110 may instantiate a smart contract for a service or data request with Entity B 120. The internal key 170 ("blockchain key") may be randomly generated.

Entity A 110 may create and stores a service request. The blockchain address that represents Entity A's account may be added to the confidential request. The account information may be used to reconcile payment for the requested service. Metadata for the ledger entry may be updated.

Entity A may close the smart contract 160 by using a master key shared with other entities involved in processing the request. Closure may include automatically encrypting all or specific confidential components of the smart contract with the internal key 170. In this example, Entity A encrypts the internal key ("blockchain key") with the master key 190 shared with Entity B 120.

Entity A may submit the private blockchain contract to the network or service endpoint for fulfillment. Submitting the contract 160 may include recording the record on the distributed ledger. The consensus server 115 of Entity A 110 may include a replication process to disseminate records to other peers on the network.

Having created the contract 160, the ledger may be monitored by an entity (e.g., Entity B). The monitoring may include identifying entries in the ledger with specific metadata or record type. Once a record is identified by an entity that can provide the requested service or data, the entity may initiate processing to fulfill the request identified by the contract 160.

Example Method of Contract Fulfillment

A method of fulfilling a smart contract may be implemented by a computing device such as a consensus server and/or access device used to submit contract information to the consensus server. Continuing from the example contract creation method discussed above, the consensus server 125 of Entity B 120 may receive the smart blockchain contract 160 and, based at least in part on metadata or record type for the contract 160, identify the contract 160 as a request for a service or data provided by Entity B 120.

Metadata included in the contract 160, such as a UUID of the master key 190, may be used to find the appropriate master key (e.g., the master key 190). If the master key is identified, then the contract 160 can be fulfilled by Entity B 120. The master key 190 may be retrieved from a data store or secured key store (not shown). Entity B 120 may use the master key 190 to decrypt the internal key 170 for opening the smart contract 160. The internal key 170 may then be used to decrypt the confidential components 180 of the smart contract 160. In some implementations, a new internal key may be randomly regenerated after the successful decryption of the smart contract data. Once the contract data is decrypted, Entity B may continue processing the contract 160 to extract the request information to fulfill the request.

Entity B 120 may store one or more results of the service request in the smart contract 160. One example of a service request is a request for credit information about a user. In such implementations, the request may include information identifying the user for which credit information is being requested. Another example of a service is generating a numeric or qualitative score. For example, a service provider may implement thousands of models that accept input values and generate numeric score or qualitative attributes for the provided input values. In some implementations, the smart contract 160 may embed a model. For example, a user may create the contract 160 by sending the appropriate factors to a server or appliance of the service provider. The contract 160 may execute immediately and store the requested score/attribute/information in the contract 160. It can immediately be sent for peer verification. Service providers and customers may be interested in using blockchain technologies to identify and prevent transactional behaviors. For example, "loan-stacking" is a transactional behavior where a user intentionally or unintentionally exceeds a predetermined credit-to-income ratio threshold by applying for and receiving credit in a short amount of time. The current delay in information about credit applications can cause this stacking. By using blockchain smart contracts, all participants can have current transaction history (e.g., credit application history) in real-time for a user to ensure behavior consistent with the predetermined criteria.

Entity B 120 may add metadata, including, for example, a blockchain address for an account that may receive payment.

Entity B 120 may close the smart contract with the master key 190. To close the smart contract 160, the internal key 170 may first be used to encrypt all or specified confidential components 180 of the smart contract 160. The master key 189 may then be used to encrypt the internal key 170.

Entity B 129 may transmit the blockchain representing the smart contact to the peer-to-peer network for external validation by consensus servers associated with other entities (e.g., Entity A). Entity B 129 can also immediately validate the smart contract 160 on a server it controls.

Example Method of Contract Validation

Entity A 110 and Entity B 120 may manage internal consensus servers 115 and 125, respectively. A consensus server may be "internal" to an entity if it is controlled by the entity. The consensus servers 115 and 125 for Entity A 110 and Entity B 120 may each have access to the master key 190 that represents the relationship between Entity A 110 and Entity B 120. Validation can be initiated after the master key 190 is used to decrypt the internal key 170 embedded in the smart contract 160. Validation may be performed by both parties. Reconciliation of accounts can be performed at a predetermined time such as: post-transaction, real-time, batch schedule, etc. In some implementations, more than two parties may coordinate satisfaction of a contract. In such implementations, each participant may have access to a master key for the contract. For example, all three entities shown in FIG. 1 have access to master key 192 which may be used for protecting an internal key 172 for a smart contract 162 associated with all three entities.

Validation may include one or more mathematical processes (e.g., a Merkle root, proof-of-work, nonces, algos, and degrees of difficulty, etc.) to confirm the integrity of the blockchain similar to those used to verify Bitcoin transactions. These processes can be resource intensive as the number of parties and records increase.

One non-limiting advantage of the master key features described is to decrease the resources needed to validate records. For example, opening and closing with the correct master key and required metadata provides a digital signature. The ledger is maintained in a private peer-to-peer network, which also provides some level of trust and protection (e.g., from distributed denial of service attacks) for the ledger. In light of these safeguards, the verification may bypass the resource intensive mathematical approach, which is designed to protect against shortcomings of an open network and total lack of trust. Validation can be done by verifying the integrity of the contract and some protected metadata such as decrypting an internal token that was encrypted with one's public key. The approach described is also one way for two participants in a multi-party contract to exchange private data and still share a core contract with all parties.

Discussion of Certain Features and Non-Limiting Advantages

Symmetric encryption in the form of shared master keys and internal keys, embedded in smart contracts, enables multiple parties to participate in confidential transactions using blockchain technology.

Shared master keys each represent non-permanent blockchain ledgers between two or more parties.

Master keys can be recreated on a predictable basis, which defines may a lifecycle for the corresponding blockchain. Recreation of the master key can be done to improve security, limit the blockchain length, or reduce the resources needed to process and validate smart contracts.

The smart contract can only be opened, closed and processed (read, modified) using the appropriate master key. Without the appropriate master key, the smart contract (or at least its confidential components) may remain encrypted and opaque to non-participating peers and outside-network entities.

The smart contract can expose a limited set of functions to retrieve and store data. The smart contract never exposes the internal key. It is a program that has blockchain components (headers, use of PKI to represent accounts/wallets/addresses, etc.) but also has the "smart" parts: the private encryption key, public metadata, encrypted data and encrypted metadata. Some possible functions that may be used to access the smart contact are shown in Table 1 below. The functions in Table 1 enable the smart contract to be implemented as a "black box" requiring little if any knowledge of the implementation on the part of the participating parties.

TABLE 1

| Example Functions | Descriptions |
| --- | --- |
| boolean open(master_key, metadata); | Opens a new smart contract using the specified master key and metadata. May return true if the open was successful and false if open failed. |
| request getRequest( ); | Obtains the request included in the smart contract. May require successful opening prior to obtaining the request. |
| void saveRequest(request); | Includes the specified request in the smart contract. The request may include a request for a service or information. |
| data getData( ); | Retrieve the data included in the smart contract. The data may represent a result or response to the request. |
| void saveData(data); | Save data in the smart contract. The data may represent a result or response to the request. |
| boolean checkData( ); | Confirms whether data is included in the contract. Returns true if included and false if not included. |
| boolean isValid( ); | Confirms whether data included in the contract is valid. Validity may be assessed based on who added data to the smart contract as well as what data was added to the smart contract. Returns true if valid and false if invalid. |
| boolean close(master_key, metadata); | Closes the smart contract using the specified master key and metadata. May return true if the close was successful and false if close failed. |

The internal key can be seamlessly auto-regenerated after successfully being decrypted by the master key and after being used by the smart contract to decrypt the confidential components.

Consensus servers may be included. The consensus servers may be included to provide the appropriate master keys in order to validate and build the blockchains.

Validation can be done with appropriate blockchain algorithms (such as Ethereum or Bitcoin's proof-of-work) or short-circuited; the act of closing a smart contract with the appropriate master key and metadata can be agreed as a legally binding, fully auditable action since only parties involved in the smart contract have access to the matching master key and supportive metadata. Hence, validation can be computationally very fast. Short-circuiting may be included where participants rely on the private network and master/internal key features to protect the ledger rather than expending resources to perform resource intensive record validation, as discussed herein.

These private smart contracts can be used to request services with or without return of data.

Example Use Case—User Credit Inquiry

The private peer-to-peer network features described may be used to provide secure transactions in a variety of systems. One example use case is a private peer-to-peer network for entities to submit credit inquiries such as part of processing a loan application. In such examples, Entity A from FIG. 1 above may be a bank or other entity deciding whether to extend credit. Entity B may be a credit reporting agency with access to user data for generating credit scores or reports.

Figure 2:
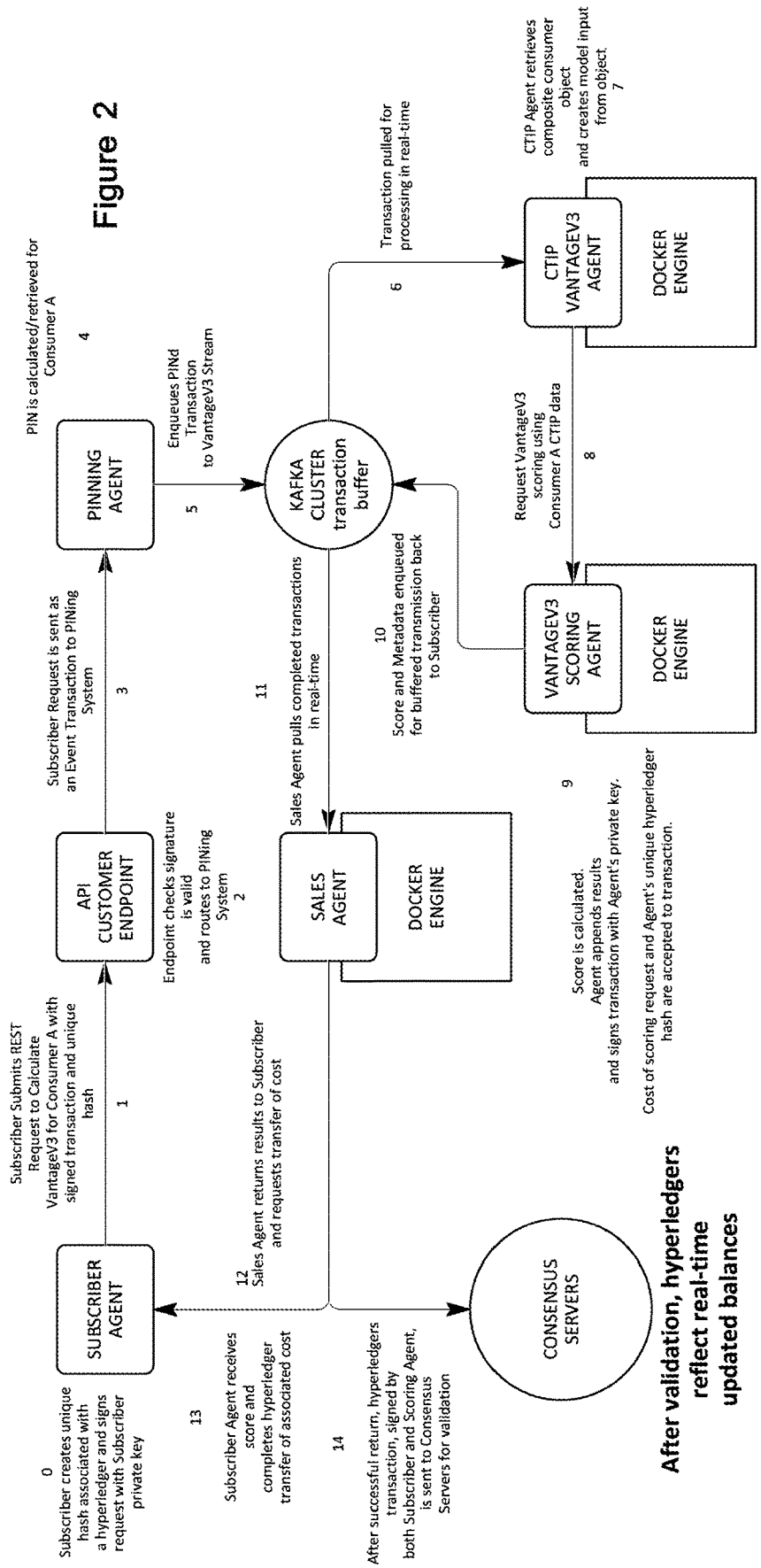
FIG. 2 is a process diagram illustrating an ordered process for providing a credit inquiry response using a distributed ledger.

FIG. 2 is a process diagram illustrating an ordered process (steps 0-14) for providing a credit inquiry response using a distributed ledger. FIG. 2 shows various exemplary systems that may participate in the use case such as a subscriber (e.g., customer of the service), subscriber agent (e.g., a system or device that that represents the subscriber in a transaction), hyperledger (e.g., a private distributed ledger data store similar to a Bitcoin Wallet), docker engine (e.g., a container that executes a single program, such as the agents); a message queue that stores intermediate data (e.g., Kafka message queues); consensus servers (e.g., machines that can mathematically verify that the signed transaction is valid. Consensus servers can be operated by both service providers and service subscribers for independent verification), other agents (e.g., systems configured to perform a single set of related tasks such as generating models, retrieving or processing inputs for the model, processing/formatting output from the model).

In the example shown in FIG. 2, a subscriber integrates with a service provider's distributed applications platform. The subscriber may create a hyperledger account with associated private and public keys. The subscriber may initiate a request to calculate a model value for a specific user through an agent process. The subscriber agent may execute the request using one of the public/private key combinations associated with the subscriber account. The request may include information about the user and metadata concerning the transaction.

The service provider's application programming interface (API) endpoint may perform a security check using the metadata. The security check may include confirming unencrypted metadata is present or that valid unencrypted metadata values are provided such that the values may be used to identify a party. Examples of such metatdata include subscriber identifier, IP address, ledger address, account identifier, etc. In some implementations, the security check may include comparing one or more values to a "whitelist" of approved values. If a value included in a contract appears on the whitelist, the contract may be permitted. The security check may be an operational security feature on the request. Additional validation of the transaction may be performed later in the processing. The user information is used to generate a lookup key for the service provider data that represents the user. In this example, the user/consumer information is provided by the requesting agent and used to find the data in the service provider's database. However, the user information may be indirectly provided, inferred, or obtained such as based on values included in the smart contract.

The entire transaction may then be buffered in a message queue. The queue may be processed in real-time as a stream. Each transaction may be "pulled" by a listening agent, such as the customer transaction information profile (CTIP) agent shown in FIG. 2. The CTIP agent may retrieve the user data based at least in part on the lookup key. The CTIP agent may process the user data to generate input data for another system such as the scoring agent. As discussed, the model may be stored as part of the smart contact. In the example shown, the Scoring Agent executes and stores the specific model (e.g., VantageV3), provides a reference to a service provider's hyperledger account using one of several associated private/public keys, transaction cost and associated metadata. The model result is then stored in a Subscriber-specific topic in the transaction buffer. A sales agent, which may be listening to that specific message queue topic on behalf of the subscriber, may "pull" transaction results in real-time and delivers it back to the subscriber agent to complete the transfer of cost. The subscriber agent may receive the transaction result and authorizes the transfer of cost to the service provider's hyperledger, referenced by the hyperledger address associated with the smart contract. The entire transaction may be represented as a blockchain that is then validated by internal and external consensus servers. The results provide real-time visibility on the transaction processing and allocation of resources for the transaction (e.g., billing).

The hyperledger may be implemented using alternate technologies dissimilar from a Bitcoin Wallet, or similar digital currency container. The implementation of the hyperledger should provide an electronic account ledger that a service provider or a service subscriber can visualize in real-time and can both validate independently. The visualization may include real-time monitoring of the ledger to identify requests and responses thereto. The visualization may include a user interface to present monitoring information in aggregate (e.g., for a particular party, request type, user(s), etc.) or for a specific request. The interface may include indicators as to whether the smart contract or elements included therein are valid. The hyperledger can be incremented up and down, even to negative values if no digital currency is used. Transfers of actual resources (e.g., money) can occur at pre-agreed intervals, including real-time.

Example System Implementation and Architecture

Figure 3:
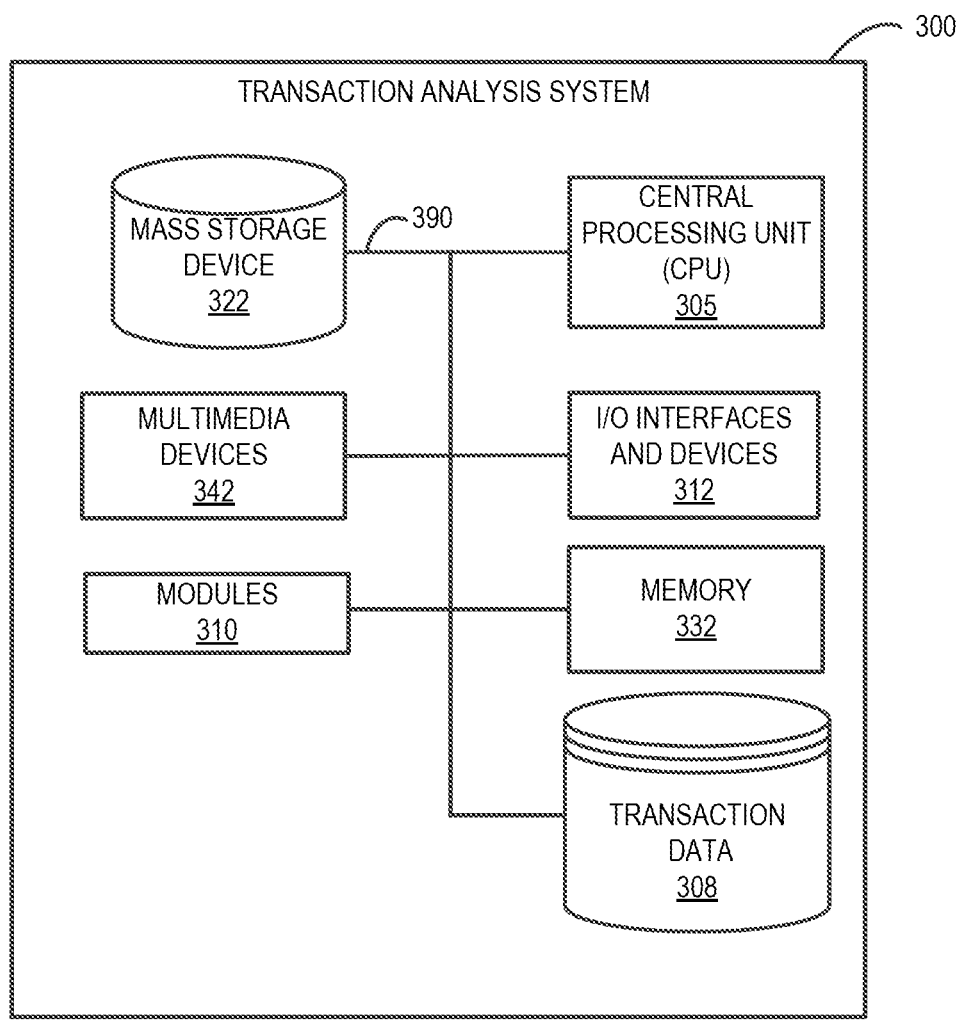
FIG. 3 is a block diagram showing example components of a distributed ledger computing system.

FIG. 3 is a block diagram showing example components of a distributed ledger computing system 300. The computing system 300 includes, for example, a personal computer that is IBM, Macintosh, or Linux/Unix compatible or a server or workstation. In one embodiment, the computing system 300 comprises a server, a laptop computer, a smart phone, a personal digital assistant, a kiosk, or a media player, for example. In one embodiment, the exemplary computing system 300 includes one or more central processing unit ("CPU") 305, which may each include a conventional or proprietary microprocessor. The computing system 300 further includes one or more memory 332, such as random access memory ("RAM") for temporary storage of information, one or more read only memory ("ROM") for permanent storage of information, and one or more mass storage device 322, such as a hard drive, diskette, solid state drive, or optical media storage device. Typically, the components of the computing system 300 are connected using a standard based bus system 390. In different embodiments, the standard based bus system 390 could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 300 may be combined into fewer components and modules or further separated into additional components and modules.

The computing system 300 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the computing system 300 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 300 may include one or more commonly available input/output (I/O) devices and interfaces 312, such as a keyboard, mouse, touchpad, and printer. In one embodiment, the I/O devices and interfaces 312 include one or more display devices, such as a monitor, that allows the visual presentation of data to a user. More particularly, a display device provides for the presentation of GUIs, application software data, and multimedia presentations, for example. The computing system 300 may also include one or more multimedia devices 342, such as speakers, video cards, graphics accelerators, and microphones, for example.

In the embodiment of FIG. 3, the I/O devices and interfaces 312 provide a communication interface to various external devices. In the embodiment of FIG. 3, the computing system 300 is electronically coupled to one or more networks, which comprise one or more of a LAN, WAN, and/or the Internet, for example, via a wired, wireless, or combination of wired and wireless, communication link. The networks communicate with various computing devices and/or other electronic devices via wired or wireless communication links, such as the credit Bureau data source and financial information data sources.

In some embodiments, information may be provided to the computing system 300 over a network from one or more data sources. The data sources may include one or more internal and/or external data sources that provide transaction data, such as credit issuers (e.g., financial institutions that issue credit cards), transaction processors (e.g., entities that process credit card swipes at points of sale), and/or transaction aggregators. The data sources may include internal and external data sources which store, for example, credit bureau data (for example, credit bureau data from File OneSM) and/or other user data. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer-readable medium, such as a compact disc, digital video disc, flash drive, or any other tangible medium. Such software code may be stored, partially or fully, on a memory device of the executing computing device, such as the computing system 300, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In the example of FIG. 3, the modules 310 may be configured for execution by the CPU 305 to perform any or all of the process discussed above with reference to FIG. 1 or 2. Depending on the embodiment, certain processes, or in the processes, or groups of processes discussed herein may be performed by multiple devices, such as multiple computing system similar to computing system 300. For example, depending on the embodiment, certain of the processes described herein may be performed by a computing system that obtains and stores the ledger, while other processes are performed by systems or devices that access the ledger for validation and yet others are performed by systems or devices that monitor, read, or write to the ledger or process requests submitted thereby.

Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, the described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (e.g., send or receive data) in accordance with one or more of the aspects described.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer-readable medium. A tangible computer-readable medium is a data storage device that can store data that is readable by a computer system. Examples of computer-readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

What is claimed is:

1. A system for secure distributed electronic ledgering, the system comprising:
   a distributed electronic ledger storing a set of records, wherein at least one record in the set of records includes a request for a service, the request encrypted with an encryption key;
   a computer-readable memory storing executable instructions; and
   one or more computer processors in communication with the computer-readable memory, wherein the one or more computer processors are configured to execute the executable instructions to at least:
       decrypt the request for the service using the encryption key;
       transmit the request to a service provider;
       receive a response from the service provider;
       insert at least a portion of the response into the record;
       encrypt the record including the portion of the response using the encryption key; and
       store the record in the distributed electronic ledger.

2. The system of claim 1, wherein the one or more computer processors are further configured to determine that the at least one record has been added to the distributed electronic ledger.

3. The system of claim 2, wherein the at least one record further includes unencrypted metadata, wherein the determination that the at least one record has been added is based on the unencrypted metadata.

4. The system of claim 1, wherein the service provider is selected based at least in part on the at least one request.

5. The system of claim 1, wherein the at least one record is generated by a client device of a plurality of client devices.

6. The system of claim 1, wherein the encryption key is encrypted with a master encryption key stored in a master encryption key store storing a plurality of master encryption keys associated with respective client devices, wherein the at least one record further comprises the encrypted encryption key.

7. The system of claim 1, wherein the request for the service includes at least one of: a request for a credit reporting service, a request for a credit report, or a request for information related to a transaction.

8. The system of claim 1, wherein the distributed electronic ledger is configured to transmit the at least one record via a network to a remote distributed electronic ledger hosted by a client device of a plurality of client devices.

9. The system of claim 8, wherein the network comprises a private peer-to-peer network.

10. The system of claim 1, wherein the one or more computer processors are further configured to:
    identify the set of records stored in the distributed electronic ledger including a value in respective unencrypted metadata portions;
    for individual records in the set of records:
        (i) retrieve a master encryption key from a master encryption key store based at least in part on unencrypted metadata of an individual record, wherein the master encryption key store stores a plurality of master encryption keys associated with respective client devices;
        (ii) decrypt a second portion of the individual record using the master encryption key to obtain an individual internal encryption key;
        (iii) decrypt a third portion of the individual record using the individual internal encryption key to obtain individual record payload data; and
        (iv) validate the individual record payload data.

11. A method comprising:
    at a distributed electronic ledger storing a record that includes an encrypted request for service, decrypting the encrypted request using an encryption key;
    transmitting the decrypted request to a service provider;
    receiving a response from the service provider;
    inserting at least a portion of the response into the record;
    encrypting the record including the portion of the response using the encryption key; and
    storing the record in the distributed electronic ledger.

12. The method of claim 11, wherein the method further comprises:
    generating a revised encryption key in response to obtaining the encryption key; and encrypting the encryption key using the revised encryption key.

13. The method of claim 11, wherein the distributed electronic ledger is configured to transmit the record via a network to a remote distributed electronic ledger hosted by a client device of a plurality of client devices.

14. The method of claim 13, wherein the network comprises a private peer-to-peer network.

15. The method of claim 11, wherein the method further comprises:
   identifying a set of records stored in the distributed electronic ledger including a value in respective unencrypted metadata portions;
   for individual records in the set of records:
   (i) retrieving a master encryption key from a master encryption key store based at least in part on unencrypted metadata of an individual record;
   (ii) decrypting a second portion of the individual record using the master encryption key to obtain an individual internal encryption key;
   (iii) decrypting a third portion of the individual record using the individual internal encryption key to obtain individual record payload data; and
   (iv) validating the individual record payload data.

16. The method of claim 15, wherein the method further comprises initiating a transfer of resources from a first source identified by the individual record payload data to a destination associated with the service.

17. A non-transitory computer storage medium storing computer-executable instructions that, when executed by a processor, cause the processor to perform the following method:
   at a distributed electronic ledger storing a record that includes an encrypted request for service, decrypting the encrypted request using an encryption key;
   transmitting the request to a service provider;
   receiving a response from the service provider;
   inserting at least a portion of the response into the record;
   encrypting the record including the portion of the response using the encryption key; and
   storing the record in the distributed electronic ledger.

18. The non-transitory computer storage medium of claim 17, wherein the method further comprises:
   generating a revised encryption key in response to obtaining the encryption key; and
   encrypting the encryption key using the revised encryption key.

19. The non-transitory computer storage medium of claim 17, wherein the distributed electronic ledger is configured to transmit the record via a network to a remote distributed electronic ledger hosted by a client device.

* * * * *